US007958140B2

(12) United States Patent  
Matsuda

(10) Patent No.: US 7,958,140 B2  
(45) Date of Patent: Jun. 7, 2011

(54) METHOD OF CONTROLLING USER INFORMATION AND INFORMATION PROCESSING APPARATUS

(75) Inventor: Toru Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 12/172,694

(22) Filed: Jul. 14, 2008

(65) Prior Publication Data

US 2009/0009804 A1 Jan. 8, 2009

Related U.S. Application Data

(62) Division of application No. 10/372,798, filed on Feb. 26, 2003, now abandoned.

(30) Foreign Application Priority Data

| Feb. 26, 2002 | (JP) | 2002-050539 |
| Feb. 26, 2002 | (JP) | 2002-050540 |
| Feb. 26, 2002 | (JP) | 2002-050547 |
| Feb. 18, 2003 | (JP) | 2003-039974 |
| Feb. 18, 2003 | (JP) | 2003-039975 |
| Feb. 18, 2003 | (JP) | 2003-039976 |
| Feb. 18, 2003 | (JP) | 2003-039977 |
| Feb. 18, 2003 | (JP) | 2003-039978 |
| Feb. 18, 2003 | (JP) | 2003-039979 |

(51) Int. Cl.  
*G06F 17/30* (2006.01)

(52) U.S. Cl. ..................... 707/769

(58) Field of Classification Search .......... 707/609, 707/705, 769, 791, 802; 358/1.14, 1.15, 358/403, 524, 530; 709/217, 218, 219  
See application file for complete search history.

(56) References Cited

U.S. PATENT DOCUMENTS

| 4,860,214 A | 8/1989 | Matsuda et al. |
| 5,338,976 A | 8/1994 | Anwyl et al. |
| 5,506,657 A | 4/1996 | Ito et al. |
| 5,974,234 A | 10/1999 | Levine et al. |
| 6,012,083 A | 1/2000 | Savitzky et al. |

(Continued)

FOREIGN PATENT DOCUMENTS

JP H02-181551 7/1990

(Continued)

OTHER PUBLICATIONS

Nariyoshi Yamai et al., "NFS-based Secure File Sharing Mechanism Over Multiple Administrative Domains with Minimal Administration", Wiley InterScience, vol. J84-D-1, No. 6, Jun. 2001, pp. 790-799 (with English Abstract).

(Continued)

*Primary Examiner* — Fred I Ehichioya  
(74) *Attorney, Agent, or Firm* — Oblon, Spivak, McClelland, Maier & Neustadt, L.L.P.

(57) ABSTRACT

A method of controlling user information for an information processing apparatus includes the steps of a process of an application program requesting user information controlling unit to obtain an item of said user information, and said user information controlling unit providing the obtained item of said user information to said process. The user information controlling unit obtains the user information requested by the process of the application program and provides the user information to the process. Accordingly, the user information can be shared by the application programs and centrally controlled.

10 Claims, 82 Drawing Sheets

U.S. PATENT DOCUMENTS

| | | | |
|---|---|---|---|
| 6,510,434 B1 | 1/2003 | Anderson et al. | |
| 6,597,469 B1 | 7/2003 | Kuroyanagi | |
| 6,601,092 B2 | 7/2003 | Itabashi et al. | |
| 6,792,082 B1 | 9/2004 | Levine | |
| 2002/0054316 A1* | 5/2002 | Abe | 358/1.14 |
| 2002/0054397 A1* | 5/2002 | Matsushima | 358/524 |
| 2003/0046533 A1 | 3/2003 | Olkin et al. | |

FOREIGN PATENT DOCUMENTS

| | | |
|---|---|---|
| JP | 6-180762 | 6/1994 |
| JP | 6-314359 | 11/1994 |
| JP | 7-334405 | 12/1995 |
| JP | 8-11381 | 1/1996 |
| JP | 8-123776 | 5/1996 |
| JP | 8-221337 | 8/1996 |
| JP | 8-286847 | 11/1996 |
| JP | 8-329005 | 12/1996 |
| JP | 9-30057 | 2/1997 |
| JP | H09-065095 | 3/1997 |
| JP | 9-179777 | 7/1997 |
| JP | 10-24845 | 1/1998 |
| JP | H10-092116 | 4/1998 |
| JP | 10-143458 | 5/1998 |
| JP | 10-187523 | 7/1998 |
| JP | 10-233913 | 9/1998 |
| JP | 10-301732 | 11/1998 |
| JP | 10-340231 | 12/1998 |
| JP | H11-215225 | 8/1999 |
| JP | 2000-29911 | 1/2000 |
| JP | 2000-047534 | 2/2000 |
| JP | 2000-137643 | 5/2000 |
| JP | 2000-172645 | 6/2000 |
| JP | 2000-267995 | 9/2000 |
| JP | 2001-34446 | 2/2001 |
| JP | 2001-51886 | 2/2001 |
| JP | 2001-175439 | 6/2001 |
| JP | 2001-202465 | 7/2001 |
| JP | 2001-283181 | 10/2001 |
| JP | 2001-285551 | 10/2001 |
| JP | 2001-312324 | 11/2001 |
| JP | 2001-345967 | 12/2001 |
| JP | 2001-350909 | 12/2001 |
| JP | 2001-358891 | 12/2001 |
| JP | 2002-24131 | 1/2002 |
| JP | 2002-32649 | 1/2002 |
| JP | 2002-41443 | 2/2002 |
| JP | 2002-049796 | 2/2002 |
| JP | 2002-84383 | 3/2002 |

OTHER PUBLICATIONS

"Surpassing the Limit of the Internet", Nikkei Byte, Nikkei Business Publications Inc., vol. 224, Dec. 22, 2001, pp. 73-79 (with English Translation of relevant part).

* cited by examiner

FIG.6

| NO. | INDEX NO. | USER NAME | USER CODE | AUTHORIZED TO USE COPYING FUNCTION? | NUMBER OF COPIED PAGES | AUTHORIZED TO USE DISTRIBUTING FUNCTION? | NUMBER OF DISTRIBUTED PAGES |
|---|---|---|---|---|---|---|---|
| 1 | 101 | Anny | 12345678 | YES | 13521 | YES | 7652 |
| 2 | 102 | Bob | 13579246 | YES | 58736 | YES | 12326 |
| 4 | 301 | Daniel | 7986421 | YES | 2111 | NO | 0 |
| 7 | 1001 | George | 22254368 | NO | 0 | YES | 5 |
| ... | ... | ... | ... | ... | ... | ... | ... |

FIG.7

| NO. | INDEX NO. | USER NAME | E-MAIL ADDRESS | AUTHORIZED TO SEND E-MAIL? |
|---|---|---|---|---|
| 1 | 101 | Anny | anny@ricoh.com | YES |
| 2 | 102 | Bob | bob@ricoh.com | YES |
| 3 | 201 | Christine | christine@ricoh.com | NO |
| 4 | 301 | Daniel | daniel@ricoh.com | NO |
| 5 | 401 | Elza | elza@ricoh.com | NO |
| 6 | 402 | Frank | frank@ricoh.com | NO |
| 7 | 1001 | George | george@ricoh.com | YES |
| ... | ... | ... | ... | ... |

FIG.10

| FREQ. USED | AB | CD | EF | GH | IJK | LMN | OPQ | RST | UXW | XYZ |
|---|---|---|---|---|---|---|---|---|---|---|

*DESCRIPTION*
   Obtaining configuration information on management service of
   user information

*FORMAT*
   void GetConfig(
             Config_t*    config
   )

*PARAMETER*
   OUT         config        /*Configuration information*/

*VALUE*
   None

FIG.15

| MEMBER | DATA TYPE |
|---|---|
| SERVICE VERSION | INTEGER |
| USABLE FUNCTIONS | SERIES OF FLAGS |
| MAXIMUM NUMBER OF ENTRIES | INTEGER |
| ... | ... |

FIG.17

**\*DESCRIPTION\***
  Registering functions to be subscribed at user control service
  After the registration, user control service posts change in user information

**\*FORMAT\***
  void Subscribe(
      FlagVector_tsubscribe
  )

**\*PARAMETER\***
  IN          subscribe     /*Flag vector indicating subscribed functions

**\*VALUE\***
  None

FIG.19

*DESCRIPTION*
  Obtaining information of all tag sets

*FORMAT*
  int GetTagSet(
      Kind_t      kind,
      TagSet_t*   tagset
  )

*PARAMETER*
  IN kind         /*Kind of user information such as destination and sender*/
  OUT tagset      /*Tag set information*/

*VALUE*
  Number of tag sets

FIG.20

| MEMBER | DATA TYPE |
|---|---|
| TAG SET CONTROL NO. | INTEGER |
| NUMBER OF TAGS ATTACHED TO TAG SET | INTEGER |
| ATTACHED TAGS | SERIES OF INTEGERS |

FIG.21

```
*DESCRIPTION*
        Obtaining tag information

*FORMAT*
        int GetTag(
                Kind_t          kind,
                id_t            tag_id,
                Tag_t*          tag
        )

*PARAMETER*
        IN kind                 /*Kind of user information*/
        IN tag_id               /*Tag identification*/
        OUT tag                 /*Tag information*/

*VALUE*
        Negative                /*Error*/
        0                       /*Success*/
```

FIG.22

| MEMBER | DATA TYPE |
|---|---|
| TAG CONTROL NO. | INTEGER |
| TAG CATEGORY | ENUMERATION |
| LABEL | SERIES OF CHARACTERS WITH ENCODING INFORMATION |

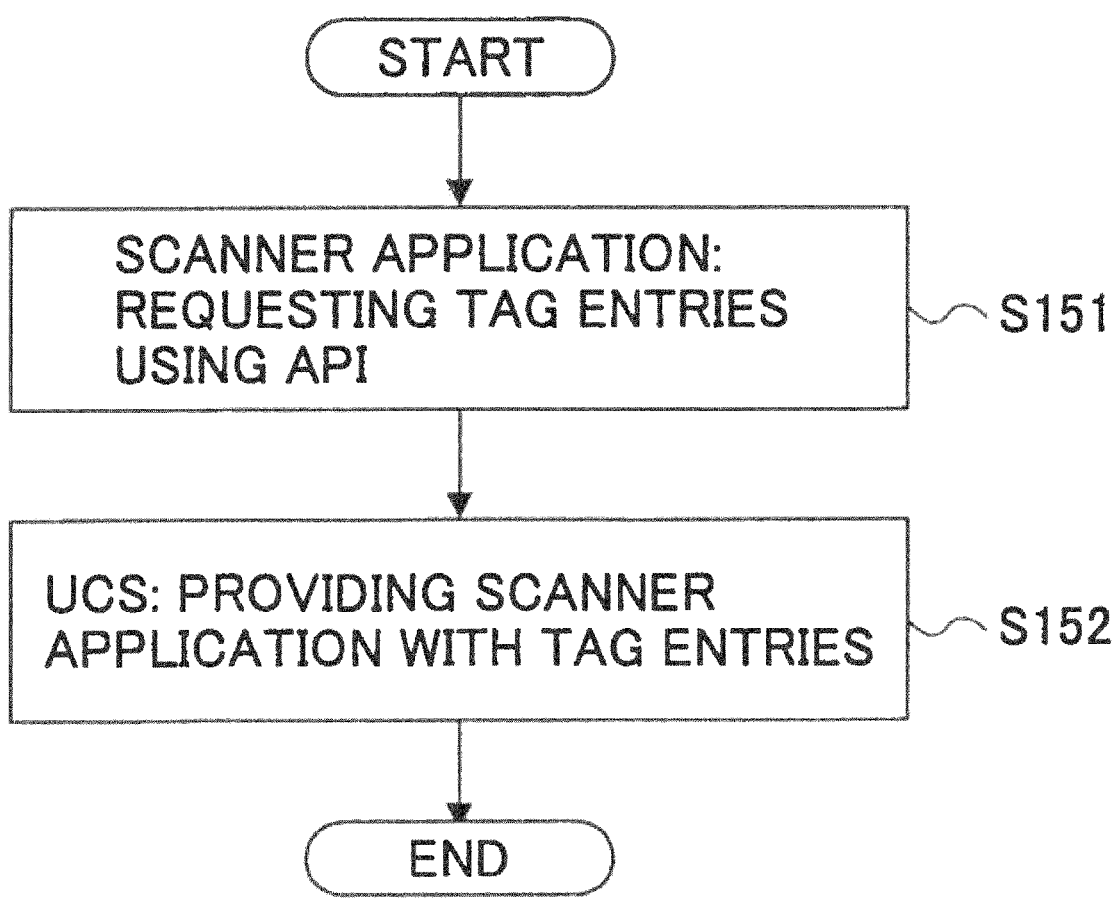

FIG.24

*DESCRIPTION*
　Obtaining list of entries assigned to a tag

*FORMAT*
```
int GetTagEntries(
    Kind_t      kind,
    id_t        tag_id,
    Filter_t    filter,
    int         offset,
    int         cnt,
    Entry_t*    entry
```

*PARAMETER*
```
IN    kind       /*Kind of user information*/
IN    tag_id     /*Tag identification number*/
IN    filter     /*Filter*/
IN    offset     /*Position to start with*/
IN    cnt        /*Number of entries to be obtained*/

OUT   entry      /*Entry information*/
```

*VALUE*
```
Negative value    /*Error*/
Others            /*Number of obtained entries*/
```

FIG.25

| MEMBER | DATA TYPE | NOTE |
|---|---|---|
| ENTRY CONTROL NUMBER | INTEGER | UNCHANGEABLE |
| ENTRY INDEX NO. | INTEGER | CHANGEABLE NUMBER FOR USER TO MEMORIZE |
| ENTRY CATEGORY | SERIES OF FLAGS | EACH FLAG INDICATES WHETHER ENTRY CAN BE DESTINATION, SENDER, AND WHETHER ENTRY IS ACCOUNT OR GROUP |
| USER NAME | CHARACTER STRING WITH ENCODING INFORMATION | |
| ⋮ | ⋮ | ⋮ |

FIG.27

**\*DESCRIPTION\***
    Obtaining entry identification number corresponding to index number

**\*FORMAT\***
    id_t GetIndexEntryId(
        Kind_t      kind,
        Filter_t    filter,
        long        index
    )

**\*PARAMETER\***
    IN    kind        /*User information category*/
    IN    filter      /*Filter*/
    IN    index       /*Index number*/

**\*VALUE\***
    Positive          /*Entry identification number*/
    Negative          /*Error*/

FIG.28

*DESCRIPTION*
　Obtaining tag to which entry is assigned

*FORMAT*
```
int GetEntryTage(
    Kind_t    kind,
    id_t      entry_id,
    id_t*     tag_id
)
```

*PARAMETER*
| | | | |
|---|---|---|---|
| IN  | kind     | /*Kind of user information*/ |
| IN  | entry_id | /*Entry identification number*/ |
| OUT | tag_id   | /*Tag identification number*/ |

*VALUE*
　Negative　/*Error*/
　Others　　/*Identification number of tag to which entry is assigned*/

FIG.29

*DESCRIPTION*
  Obtaining the position of an entry in a tag

*FORMAT*
  int GetTagEntryPos(
      Kind_t     kind,         /*Kind of user information*/
      Filter_t   filter,       /*Filter*/
      id_t       tag_id,       /*Tag identification number*/
      id_t       entry_id
  )

*PARAMETER*
  IN    kind
  IN    filter
  IN    tag_id

*VALUE*
  Negative    /*Error*/
  Positive    /*Position*/

FIG.30

```
*DESCRIPTION*
    Obtaining e-mail information
*FORMAT*
    int GetMail(
        Kind_t      kind,
        id_t        entry_id,
        Mail_t*     mail
    )
*PARAMETER*
    IN      kind            /*Kind of user information*/
    IN      entry_id        /*Entry identification number*/
    OUT     mail            /*Mail information*/
*VALUE*
    Negative                /*Error*/
    0                       /*Success*/
```

FIG.31

**\*DESCRIPTION\***
  Obtaining authentication information of a sender

**\*FORMAT\***
  int GetAuth(
              Kind_t    kind,          /\*Kind of user information\*/
              id_t      entry_id,      /\*Entry identification number\*/
              Auth_t\*   auth           /\*Authentication information\*/
             )

**\*PARAMETER\***
  IN    kind
  IN    entry_id
  OUT   auth

**\*VALUE\***
  Negative    /\*Error\*/
  0           /\*Success\*/

FIG.32

\*DESCRIPTION\*
   Obtaining restrictive information of a user

\*FORMAT\*
   void GetUsercode(
      Kind_t      kind,
      id_t        entry_id,
      Usercode_t\*  usercode
   )

\*PARAMETER\*
   IN     kind       /\*Kind of user information\*/
   IN     entry_id   /\*Entry identification number\*/
   OUT   usercode   /\*User code information\*/

\*VALUE\*
   None

FIG.33

*DESCRIPTION*
    Obtaining mail group information

*FORMAT*
    int GetMailGroup(
        Kind_t      kind,
        id_t        entry_id,
        Group_t*    group
    )

*PARAMETER*
    IN    kind       /*Kind of user information*/
    IN    entry_id   /*Entry identification number*/
    OUT   group      /*Mail group information*/

*VALUE*
    Negative    /*Error*/
    0           /*Success*/

FIG.34

*DESCRIPTION*
Searching an entry

*FORMAT*
```
int Search(
    Kind_t      kind,
    Filter_t    filter,
    int         max_hit,
    int*        hit,
    Search_t*   search,
    int         cnt
)
```

*PARAMETER*
| | | | |
|---|---|---|---|
| IN  | kind    | | /*Kind of user information*/ |
| IN  | filter  | | /*Filter*/ |
| IN  | max_hit | | /*Maximum number of hits*/ |
| OUT | hit     | | /*Number of hits*/ |
| IN  | search  | | /*Search condition*/ |
| IN  | cnt     | | /*Number of search conditions*/ |

*VALUE*
| | |
|---|---|
| Negative | /*Error*/ |
| 0 | /*Success*/ |
| 1 | /*Exceeding maximum number of hits*/ |

FIG.41

*DESCRIPTION*
    Creating a new entry

*FORMAT*
    int AddEntry(
        Kind_t                kind,
        Entry_t*     entry
    )

*PARAMETER*
    IN        kind       /*Kind of user information*/
    IN        entry      /*Entry information*/

*VALUE*
    -1        /*Unable to add a new entry*/
    -2        /*Abbreviated number already exits*/
    0         /*Success*/

FIG.42

*DESCRIPTION*
    Setting an entry tag to which an entry is to be attached

*FORMAT*
    int SetEntryTag(
        Kind_t    kind,
        id_t      entry_id,
        id_t*     tag_id,
        int       cnt
    )

*PARAMETER*
    IN        kind       /*Kind of user information*/
    IN        entry_id   /*Entry ID*/
    IN        tag_id     /*Tag ID*/
    IN        cnt        /*Number of tag ID*/

*VALUE*
    -1        /*Entry ID does not exist*/
    -2        /*Tag ID does not exist*/
    Others    /*Number of tags to which the entry is attached*/

FIG.43

```
*DESCRIPTION*
        Setting user restriction information

*FORMAT*
        void SetUsercode(
                Kind_t          kind,
                id_t            entry_id,
                Usercode_t*     usercode
        )

*PARAMETER*
        IN      kind            /*Kind of user information*/
        IN      entry_id        /*Entry ID*/
        IN      usercode        /*Usercode information*/

*VALUE*
        None
```

FIG.44

*DESCRIPTION*
    Setting mail information

*FORMAT*
    int SetMail(
        Kind_t    kind,
        id_t    entry_id,
        Mail_t*    mail
    )

*PARAMETER*
| | | |
|---|---|---|
| IN | kind | /*Kind of user information*/ |
| IN | entry_id | /*Entry ID*/ |
| IN | mail | /*Mail information*/ |

*VALUE*
| | |
|---|---|
| -1 | /*Entry ID does not exist*/ |
| 0 | /*Success*/ |

FIG.45

*DESCRIPTION*
    Obtaining minimum unused index number exceeding a designated number

*FORMAT*
    long CheckEntryIndex(
        Kind_t    kind,
        long    index
    )

*PARAMETER*
| | | |
|---|---|---|
| IN | kind | /*Kind of user information*/ |
| IN | index | /*Index number*/ |

*VALUE*
| | |
|---|---|
| Positive | /*Minimum unused index number exceeding the designated number*/ |
| Negative | /*Error*/ |

FIG.46

*DESCRIPTION*
    Obtaining groups to which an entry is attached

*FORMAT*
    int CheckEntryGroup(
        Kind_t    kind,
        id_t      entry_id
    )

*PARAMETER*
    IN    kind    /*Kind of user information*/
    IN    entry_id    /*Entry ID number*/

*VALUE*
    0    /*Entry is not attached to a group*/
    1    /*Entry is attached to a group*/

FIG.47

*DESCRIPTION*
    Updating entry information

*FORMAT*
    int ModifyEntry(
        Kind_t    kind,
        id_t      entry_id,
        Entry_t*    entry
    )

*PARAMETER*
    IN    kind    /*Kind of user information*/
    IN    entry_id    /*Entry ID*/
    IN    entry    /*Entry information*/

*VALUE*
    -1    /*Abbreviated number already exists*/
    0    /*Success*/

FIG.48

*DESCRIPTION*
    Deleting entry information

*FORMAT*
    int DeleteEntry(
        Kind_t    kind,
        id_t    entry_id
    )

*PARAMETER*
    IN    kind    /*Kind of user information*/
    IN    entry_id    /*Entry ID*/

*VALUE*
    -1    /*No entry ID exists*/
    -2    /*Undeletable since entry is used*/
    0    /*Success*/

FIG.49

*DESCRIPTION*
    Updating tag information

*FORMAT*
    int ModifyTag(
        Kind_t    kind,
        id_t    tag_id,
        Tag_t*    tag
    )

*PARAMETER*
    IN    kind    /*Kind of user information*/
    IN    tag_id    /*Tag ID*/
    IN    tag    /*Tag information*/

*VALUE*
    -1    /*Tag ID does not exist*/
    -2    /*Tag ID*/
    0    /*Success*/

FIG.50

*DESCRIPTION*
    Moving position of tag entry
*FORMAT*
    int MoveTagEntryPos(
        Kind_t    kind,
        id_t      tag_id,
        id_t      entry_id,
        int       offset
    )
*PARAMETER*
    IN    kind       /*Kind of user information*/
    IN    tag_id     /*Tag ID*/
    IN    entry_id   /*Entry ID*/
    IN    offset     /*Position to which tag is moved*/
*VALUE*
    -1    /*Tag ID does not exist*/
    -2    /*Entry ID does not exist*/
    -3    /*Unable to move*/
     0    /*Success*/

FIG.51

```
*DESCRIPTION*
         Setting authentication information
*FORMAT*
         int SetAuth(
                  Kind_t       kind,
                  id_t                                entry_id,
                  Auth_t*                  auth
         )
*PARAMETER*
         IN       kind           /*Kind of user information*/
         IN       entry_id                 /*Entry ID*/
         IN       auth           /*Authentication information*/
*VALUE*
         -1       /*Entry ID does not exist*/
         0        /*Success*/
```

FIG.52

```
*DESCRIPTION*
          Setting mail group
*FORMAT*
          int SetMailGroup
                    Kind_t         kind,
                    id_t                             entry_id,
                    MailGroup_t*   group
          )
*PARAMETER*
          IN        kind           /*Kind of user entry*/
          IN        entry_id       /*Entry ID*/
          IN        group          /*Mail group information*/
*VALUE*
          -1        /*Entry ID does not exist*/
          0         /*Success*/
```

FIG.53

```
*DESCRIPTION*
          Obtaining number of entries

*FORMAT*
          int GetEntryCount(
                    Kind_t         kind
          )

*PARAMETER*
          IN        kind           /*Kind of user information*/

*VALUE*
          Non negative    /*Number of entries*/
          Negative        /*Error*/
```

FIG.54

```
*DESCRIPTION*
        Obtaining number of accounts

*FORMAT*
        int GetAccountCount(
                Kind_t      kind
        )

*PARAMETER*
        IN          kind        /*Kind of user information*/

*VALUE*
        Non negative            /*Number of accounts*/
        Negative                /*Error*/
```

FIG.55

```
*DESCRIPTION*
        Obtaining number of groups

*FORMAT*
        int GetGroupCount(
                Kind_t      kind
        )

*PARAMETER*
        IN          kind        /*Kind of user information*/

*VALUE*
        Non negative            /*Number of groups*/
        Negative                /*Error*/
```

FIG.56

*DESCRIPTION*
    Obtaining number of mail addresses

*FORMAT*
    int GetMailCount(
        Kind_t    kind,
    )

*PARAMETER*
    IN    kind    /*Kind of user information*/

*VALUE*
    Non negative    /*Number of mail addresses*/
    Negative    /*Error*/

FIG.57

*DESCRIPTION*
    Obtaining number of usercodes

*FORMAT*
    int GetUsercodeCount(
        Kind_t    kind,
    )

*PARAMETER*
    IN    kind    /*Kind of user information*/

*VALUE*
    Non negative    /*Number of usercodes*/
    Negative    /*Error*/

FIG.60A

```
<?xml version="1.0"?>

<definitions xmlns:tns="http://www.ricoh.co.jp/xmlns/soap/userdirectory"

xmlns:ud="http://www.ricoh.co.jp/xmlns/schema/userdirectory"

xmlns="http://schemas.xmlsoap.org/wsdl/"

xmlns:sb="http://schemas.xmlsoap.org/wsdl/soap/"

xmlns:xs="http://www.w3.org/2001/XMLSchema"

targetNamespace="http://www.ricoh.co.jp/xmlns/soap/userdirec
tory">

<import namespace="http://www.ricoh.co.jp/xmlns/schema/userdirect
ory"

location="userdirectory.xsd"/>
```

(OMITTED)

```
  <message name="getGeneration_inParam">                    ⎫
    <part name="ticket" type="xs:base64Binary">             ⎪
      <documentation/>                                      ⎬ 3140
    </part>                                                 ⎪
  </message>                                                ⎭
```

(OMITTED)

```
  <message name="getGeneration_outParam">                   ⎫
    <part name="returnValue" type="ud:retCode_enum">        ⎪
      <documentation/>                                      ⎪
    </part>                                                 ⎬ 3141
    <part name="generation_out" type="xs:unsignedInt">      ⎪
      <documentation/>                                      ⎪
    </part>                                                 ⎪
  </message>                                                ⎭
```

(OMITTED)

FIG.60B

```
<portType name="userDirectoryHttpType">
    (OMMITTED)
    <operation name="getGeneration">
        <documentation/>
        <input message="tns:getGeneration_inParam"/>
        <output message="tns:getGeneration_outParam"/>
    </operation>
    (OMMITTED)
</portType>
<binding
    name="userDirectoryHttpBinding"
    type="tns:userDirectoryHttpType">
    <sb:binding
        transport="http://schemas.xmlsoap.org/soap/http"
        style="rpc"/>
    (OMMITTED)
    <operation name="getGeneration">
        <documentation/>
        <sb:operation
            soapAction="http://www.ricoh.co.jp/xmlns/soap/userdirectory#getGeneration"/>
        <input>
            <sb:body
                encodingStyle="http://schemas.xmlsoap.org/soap/encoding/"
                use="encoded"
                namespace="http://www.ricoh.co.jp/xmlns/soap/userdirectory"/>
        </input>
```

3142 (bracket grouping the `<operation name="getGeneration">` block in the portType)

FIG.60C

```
    <output>
        <sb:body
            encodingStyle="http://schemas.xmlsoap.org/soap/encoding/"
            use="encoded"
            namespace="http://www.ricoh.co.jp/xmlns/soap/userdirectory"/>
    </output>
    </operation>
        (OMMITTED)
    </binding>
    <service name="userDirectory">
        <documentation/>
        <port
            name="userDirectoryHttpPrototype1"
            binding="tns:userDirectoryHttpBinding">
            <documentation/>
            <sb:address location="http://localhost:8000/foo"/>
        </port>
    </service>
</definitions>
```

FIG.62

WEB SERVICE FOR OBTAINING CONFIGURATION INFORMATION (getCapability)

| | PARAMETERS | DATA TYPE | DESCRIPTION | NOTE |
|---|---|---|---|---|
| INPUT | NONE | | | |
| OUTPUT | returnValue | ENUMERATION | STATE | STATE INDICATES NORMAL, SYSTEM BUSY, AND SO FORTH. |
| | capability_out | DATA STRUCTURE OF CONFIGURATION INFORMATION | CONFIGURATION INFORMATION | |

FIG.63

DATA STRUCTURE OF CONFIGURATION INFORMATION

| MEMBER | DATA TYPE | NOTE |
|---|---|---|
| PROTOCOL VERSION | NONNEGATIVE INTEGER | INCORPORATED IN USER INFORMATION CONTROL SERVICE. |
| SERVICE IDENTIFIER | STRING | CREATED BY USER INFORMATION CONTROL SERVICE BASED ON CONFIGURATION INFORMATION. DIFFERENT FOR EACH APPARATUS. USED BY EXTERNAL CONTROL APPARATUS TO IDENTIFY OBJECT APPARATUS. |
| MAXIMUM NUMBER OF INTEGERS IN NONNEGATIVE INTEGER SERIES | NONNEGATIVE INTEGER | INCORPORATED IN USER INFORMATION CONTROL SERVICE. INDICATING MAXIMUM NUMBER OF NONNEGATIVE INTEGERS EXCHANGABLE IN ONE CALL. |
| MAXIMUM NUMBER OF INTEGERS IN ENTRY INFORMATION | NONNEGATIVE INTEGER | INCORPORATED IN USER INFORMATION CONTROL SERVICE. INDICATING MAXIMUM NUMBER OF ENTRY INFORMATION SERIES EXCHANGABLE IN ONE CALL. |
| ... | ... | ... |
| MAXIMUM NUMBER OF ENTRIES | NONNEGATIVE INTEGER | CONTROL PARAMETERS OF USER INFORMATION CONTROL SERVICE. AN ENTRY BEING MINIMUM UNIT SUCH AS ADDRESSEE/SENDER/CHARGABLE USER. EACH ENTRY HAS ITS NAME, INDEX NUMBER, AND SO FORTH. |
| MAXIMUM NUMBER OF MAIL INFORMATION | NONNEGATIVE INTEGER | CONTROL PARAMETERS OF USER INFORMATION CONTROL SERVICE. |
| MAXIMUM NUMBER OF USER CODE ENTRIES | NONNEGATIVE INTEGER | SET BY CHARGE INFORMATION CONTROL MODULE BASED ON CONFIGURATION INFORMATION. INQUIRED BY USER INFORMATION CONTROL SERVICE. |
| ... | ... | ... |
| MAXIMUM BYTES OF ACCOUNT NAME | NONNEGATIVE INTEGER | INCORPORATED IN USER INFORMATION CONTROL SERVICE. |
| MAXIMUM BYTES OF GROUP NAME | NONNEGATIVE INTEGER | INCORPORATED IN USER INFORMATION CONTROL SERVICE. |
| ... | ... | ... |

FIG.64

| AUTHENTICATE | | | | |
|---|---|---|---|---|
| | PARAMETER | DATA TYPE | DESCRIPTION | NOTE |
| INPUT | password | BINARY DATA | PASSWORD | ENCRIPTED |
| | returnValue | ENUMERATION | ENDING STATE | INDICATING NORMAL COMPLETION, SYSTEM BUSY, AND SO FORTH. |
| OUTPUT | ticket_out | BINARY DATA | AUTHENTICATION INFORMATION | REQUIRED FOR SUBSEQUENT METHOD CALL TO INDICATE AUTHENTICATION. |

FIG.65 getGeneration

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| OUTPUT | returnValue | ENUMERATION | ENDING STATE | INDICATING NORMAL COMPLETION, SYSTEM BUSY, AND SO FORTH. |
| | generation_out | NONNEGATIVE INTEGER | GENERATION NUMBER | UPDATED EVERYTIME USER INFORMATION IS UPDATED. KEEPING RETURNED GENERATION NUMBER TO COMPARE WITH NEW GENERATION NUMBER AND DETERMINE WHETHER USER INFORMATION IS UPDATED BY ANOTHER USER. |

FIG.66 getTagSets

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| INPUT | generation_inout | NONNEGATIVE INTEGER | SENERATION NUMBER | USED TO DETERMINE WHETHER USER INFORMATION IS UPDATED BY OTHER. |
| | returnValue | ENUMERATION | ENDING STATE | INDICATING NORMAL COMPLETION, SYSTEM BUSY, AND SO FORTH. |
| OUTPUT | generation_inout | NONNEGATIVE INTEGER | GENERATION NUMBER | USED TO DETERMINE WHETHER USER INFORMATION IS UPDATED BY OTHER. |
| OUTPUT | tagSets_out | ARRAY STRUCTURED AS TAG SET INFORMATION | ARRAY STRUCTURED AS TAG SET INFORMATION | |

FIG.67

DATA STRUCTURE OF TAG SET

| MEMBER | DATA TYPE | NOTE |
|---|---|---|
| CONTROL NUMBER | NONNEGATIVE INTEGER | |
| FREQUENTLY USED | BOOLEAN | IRREGULAR "FREQUENTLY USED" TAG SET AND ONE REGULAR TAG SET ARE USUALLY DISPLAYED FOR LOCAL SERVICES. |
| CHANGEABILITY | BOOLEAN | |
| ... | ... | ... |
| MINIMUM NUMBER OF ATTACHED TAGS | NONNEGATIVE INTEGER | CURRENTLY FIXED. EQUAL TO MAXIMUM. |
| MAXIMUM NUMBER OF ATTACHED TAGS | NONNEGATIVE INTEGER | CURRENTLY FIXED. EQUAL TO MINIMUM. |
| MAXIMUM BYTES OF TAG LABEL | NONNEGATIVE INTEGER | |
| MAXIMUM NUMBER OF TAG ENTRY | NONNEGATIVE INTEGER | |
| ... | ... | ... |

FIG.68

| getTagSetTags | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | tagSetId | NONNEGATIVE INTEGER | TAG SET CONTROL NUMBER | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | tags_out | ARRAY WITH TAG DATA STRUCTURE | ARRAY WITH TAG DATA STRUCTURE | |

FIG.69

| TAG DATA STRUCTURE | | |
|---|---|---|
| MEMBER | DATA TYPE | NOTE |
| TAG CONTROL NUMBER | NONNEGATIVE INTEGER | |
| LABEL | STRING WITH ENCODING INFORMATION | |

FIG.70 getTagEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | tagId | NONNEGATIVE INTEGER | TAG CONTROL NUMBER | |
| | filter | FILTER STRUCTURE | FILTER | DESIGNATING FILTERING CONDITION. USEFUL WHEN ALL TAG ENTRIES HAVING MAIL ADDRESS ARE TO BE PICKED UP, FOR EXAMPLE. |
| | offset | NONNEGATIVE INTEGER | NUMBER OF ENTRIES TO BE SKIPPED | A NUMBER OF OFFSET OF TAG ENTRIES ARE NOT OBTAINED. FOR EXAMPLE, IF COUNT=30, FIRST 30 ENTRIES ARE OBTAINED BY SETTING OFFSET=0, SECOND 30 ENTRIES ARE OBTAINED BY SETTING OFFSET=30, AND THIRD 30 ENTRIES ARE OBTAINED BY SETTING OFFSET=60. |
| | count | NONNEGATIVE INTEGER | MAXIMUM NUMBER OF ENTRIES SIMULTANEOUSLY OBTAINABLE | A NUMBER OF COUNT OF ENTRIES ARE OBTAINABLE AT A TIME. |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | totalCount_out | NONNEGATIVE INTEGER | NUMBER OF ENTRIES SATISFYING CONDITION | |
| | last_out | BOOLEAN | WHOLE ENTRIES OBTAINED? | INDICATING WHETHER WHOLE ENTRIES SATISFYING CONDITION HAVE BEEN OBTAINED. |
| | entries_out | ARRAY WITH ENTRY DATA STRUCTURE | ARRAY WITH ENTRY DATA STRUCTURE | |

FIG.71

FILTER STRUCTURE

| MEMBER | DATA TYPE | NOTE |
|---|---|---|
| ALL | BOOLEAN | INDICATING WHETHER ALL ENTRIES ARE TO BE OBTAINED. |
| MAIL ADDRESSEE | BOOLEAN | INDICATING WHETHER ENTRIES HAVING MAIL ADDRESS ARE TO BE OBTAINED. |
| MAIL SENDER | BOOLEAN | INDICATING WHETHER ENTRIES THAT CAN BE MAIL SENDERS ARE TO BE OBTAINED. |
| FAX ADDRESSEE | BOOLEAN | INDICATING WHETHER ENTRIES HAVING FACSIMILE NUMBER ARE TO BE OBTAINED. |
| USER CODE | BOOLEAN | INDICATING WHETHER ENTRIES HAVING USER CODE ARE TO BE OBTAINED. |
| ... | ... | ... |

FIG.72

| ENTRY DATA STRUCTURE | | |
|---|---|---|
| MEMBER | DATA TYPE | NOTE |
| ENTRY CONTROL NUMBER | NONNEGATIVE INTEGER | UNCHANGEABLE |
| ENTRY INDEX NUMBER | NONNEGATIVE INTEGER | NUMBER FOR USERS TO MEMORIZE. CHANGEABLE. |
| ENTRY CATEGORY | FLAG SERIES | INDICATING WHETHER ENTRIES CAN BE MAIL ADDRESSEE, MAIL SENDER, AND SO FORTH. INDICATING WHICH AN INDIVIDUAL ACCOUNT OR A GROUP OF ACCOUNTS. |
| USER NAME | STRING WITH ENCODING INFORMATION | |
| ... | ... | ... |

FIG.73 getAccountEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | entryIds | NONNEGATIVE INTEGER ARRAY | ARRAY OF ENTRY CONTROL NUMBERS | |
| | mask | FLAG SERIES | DESIGNATION OF MEMBERS TO BE OBTAINED | FLAG SERIES WITH THE SAME FORMAT AS ENTRY CATEGORY. INDICATING DESIRED MEMBER IN ACCOUNT STRUCTURE, FOR EXAMPLE, MAIL ADDRESSEES AND MAIL SENDERS. MEMBER THAT IS NOT DESIGNATED BECOMES ARE SET TO DUMMY VALUE. |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | entries_out | ARRAY WITH ACCOUNT DATA STRUCTURE | ARRAY OF ACCOUNT INFORMATION | |

FIG.74

ACCOUNT DATA STRUCTURE

| MEMBER | DATA TYPE | NOTE |
|---|---|---|
| ENTRY | NONNEGATIVE INTEGER | |
| ATTACHED TAG | NONNEGATIVE INTEGER | ARRAY OF TAG CONTROL NUMBERS |
| ATTACHED GROUP | NONNEGATIVE INTEGER | ARRAY OF ENTRY CONTROL NUMBERS |
| MAIL ADDRESS | MAIL ADDRESS DATA STRUCTURE | |
| FACSIMILE NUMBER | FAX NUMBER DATA STRUCTURE | |
| USERCODE | USERCODE DATA STRUCTURE | |
| ... | ... | ... |

FIG.75

MAIL ADDRESS DATA STRUCTURE

| MEMBER | DATA TYPE | NOTE |
|---|---|---|
| MAIL SENDER | BOOLEAN | INDICATING WHETHER THE ENTRY CAN BE MAIL SENDER. |
| MAIL ADDRESS | STRING | |
| ... | | ... |

FIG.76

FACSIMILE NUMBER DATA STRUCTURE

| MEMBER | DATA TYPE | NOTE |
|---|---|---|
| FACSIMILE NUMBER | STRING | |
| ... | | ... |

FIG.77

USERCODE DATA STRUCTURE

| MEMBER | DATA TYPE | NOTE |
|---|---|---|
| USERCODE | STRING | |
| ... | | ... |

FIG.78 getGroupEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | entryIds | NONNEGATIVE INTEGER ARRAY | ARRAY OF ENTRY CONTROL NUMBERS | |
| | mask | FLAG SERIES | DESIGNATION OF MEMBERS TO BE OBTAINED | FLAG SERIES WITH THE SAME FORMAT AS ENTRY CATEGORY. INDICATING DESIRED MEMBER IN ACCOUNT STRUCTURE, FOR EXAMPLE, MAIL ADDRESSEES AND MAIL SENDERS. MEMBER THAT IS NOT DESIGNATED BECOMES ARE SET TO DUMMY VALUE. |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | entries_out | ARRAY WITH GROUP DATA STRUCTURE | ARRAY OF GROUP INFORMATION | |

FIG.79

| GROUP DATA STRUCTURE | | |
|---|---|---|
| MEMBER | DATA TYPE | NOTE |
| ENTRY | NONNEGATIVE INTEGER | |
| ATTACHED TAG | NONNEGATIVE INTEGER | ARRAY OF TAG CONTROL NUMBERS |
| ACCOUNTS ATTACHED TO GROUP | NONNEGATIVE INTEGER | ARRAY OF ENTRY CONTROL NUMBERS |
| MAIL GROUP | MAIL GROUP DATA STRUCTURE | |
| FACSIMILE GROUP | FACSIMILE GROUP DATA STRUCTURE | |
| ... | ... | ... |

FIG.80

MAIL GROUP DATA STRUCTURE

| MEMBER | DATA TYPE | NOTE |
|---|---|---|
| MAIL GROUP | BOOLEAN | INDICATING WHETHER EFFECTIVE AS MAIL GROUP |
| ... | ... | ... |

FIG.81

FACSIMILE GROUP DATA STRUCTURE

| MEMBER | DATA TYPE | NOTE |
|---|---|---|
| FACSIMILE GROUP | BOOLEAN | INDICATING WHETHER EFFECTIVE AS FACSIMILE GROUP |
| ... | ... | ... |

FIG.82 setTagSetTags (mainly changing labels)

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | tagSetId | NONNEGATIVE INTEGER | TAG SET CONTROL NUMBER | |
| | tags | ARRAY WITH TAG DATA STRUCTURE | TAG ARRAY | CURRENTLY TAG CONTROL NUMBER IS NOT CHANGED, ONLY TAG LABEL IS CHANGED. |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | count_out | NONNEGATIVE INTEGER | NUMBER OF SET TAGS | |

FIG.83 setTagEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | tagId | NONNEGATIVE INTEGER | TAG CONTROL NUMBER | |
| | offset | NONNEGATIVE INTEGER | NUMBER OF ENTRIES TO BE SKIPPED | A NUMBER OF OFFSET OF TAG ENTRIES ARE NOT OBTAINED. FOR EXAMPLE, IF COUNT=30, FIRST 30 ENTRIES ARE OBTAINED BY SETTING OFFSET=0, SECOND 30 ENTRIES ARE OBTAINED BY SETTING OFFSET=30, AND THIRD 30 ENTRIES ARE OBTAINED BY SETTING OFFSET=60. |
| | commit | BOOLEAN | LAST ENTRY | WHILE COMMIT IS OFF, UPDATING DATA ARE STORED IN BUFFER. WHEN COMMIT IS TURNED ON, UPDATING DATA ARE REFLECTED IN ENTRIES. |
| | entryIds | NONNEGATIVE INTEGER | ARRAY OF ENTRY CONTROL | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | count_out | NONNEGATIVE INTEGER | NUMBER OF ENTRIES PROPERLY PROCESSED | |

FIG.84

| deleteEntries | | PARAMETER | DATA TYPE | DESCRIPTION | NOTE |
|---|---|---|---|---|---|
| | INPUT | ticket | BINARY | AUTHENTICATION INFORMATION | INDICATING USER IS AUTHENTICATED. |
| | | generation_inout | NONNEGATIVE INTEGER | GENERATION NUMBER | USED TO DETERMINE WHETHER USER INFORMATION IS UPDATED BY OTHER. |
| | | entryIds | NONNEGATIVE INTEGER ARRAY | ARRAY OF ENTRY CONTROL | |
| | OUTPUT | returnValue | ENUMERATION | ENDING STATE | INDICATING NORMAL COMPLETION, SYSTEM BUSY, AND SO FORTH. |
| | | generation_inout | NONNEGATIVE INTEGER | GENERATION NUMBER | USED TO DETERMINE WHETHER USER INFORMATION IS UPDATED BY OTHER. |
| | | count_out | NONNEGATIVE INTEGER | NUMBER OF DELETED ENTRIES | |

FIG.85 newAccountEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | entries | ARRAY WITH ACCOUNT DATA STRUCTURE | ARRAY OF ACCOUNTS | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | entryIds_out | NONNEGATIVE INTEGER ARRAY | ARRAY OF NEW ENTRY CONTROL NUMBERS | |

FIG.86 setAccountEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | mask | FLAG SERIES | DESIGNATION OF MEMBERS TO BE OBTAINED | FLAG SERIES WITH THE SAME FORMAT AS ENTRY CATEGORY. INDICATING DESIRED MEMBER IN ACCOUNT STRUCTURE, FOR EXAMPLE, MAIL ADDRESSEES AND MAIL SENDERS. MEMBER THAT IS NOT DESIGNATED BECOMES ARE SET TO |
| | entries | ARRAY WITH ACOUNT DATA STRUCTURE | ARRAY OF ACCOUNT INFORMATION | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | count_out | NONNEGATIVE INTEGER | NUMBER OF UPDATED ENTRIES | |

FIG.87 newGroupEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | entries | ARRAY WITH GROUP DATA STRUCTURE | ARRAY OF GROUP DATA STRUCTURE INFORMATION | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | entryIds_out | NONNEGATIVE INTEGER ARRAY | ARRAY OF NEW ENTRY CONTROL NUMBERS | |

FIG.88 setGroupEntries

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | mask | FLAG SERIES | DESIGNATION OF MEMBERS TO BE OBTAINED | FLAG SERIES WITH THE SAME FORMAT AS ENTRY CATEGORY. INDICATING DESIRED MEMBER IN ACCOUNT STRUCTURE, FOR EXAMPLE, MAIL ADDRESSEES AND MAIL SENDERS. MEMBER THAT IS NOT DESIGNATED BECOMES ARE SET TO |
| | entries | ARRAY WITH GROUP DATA STRUCTURE | ARRAY OF GROUP INFORMATION | |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |
| | count_out | NONNEGATIVE INTEGER | NUMBER OF UPDATED ENTRIES | |

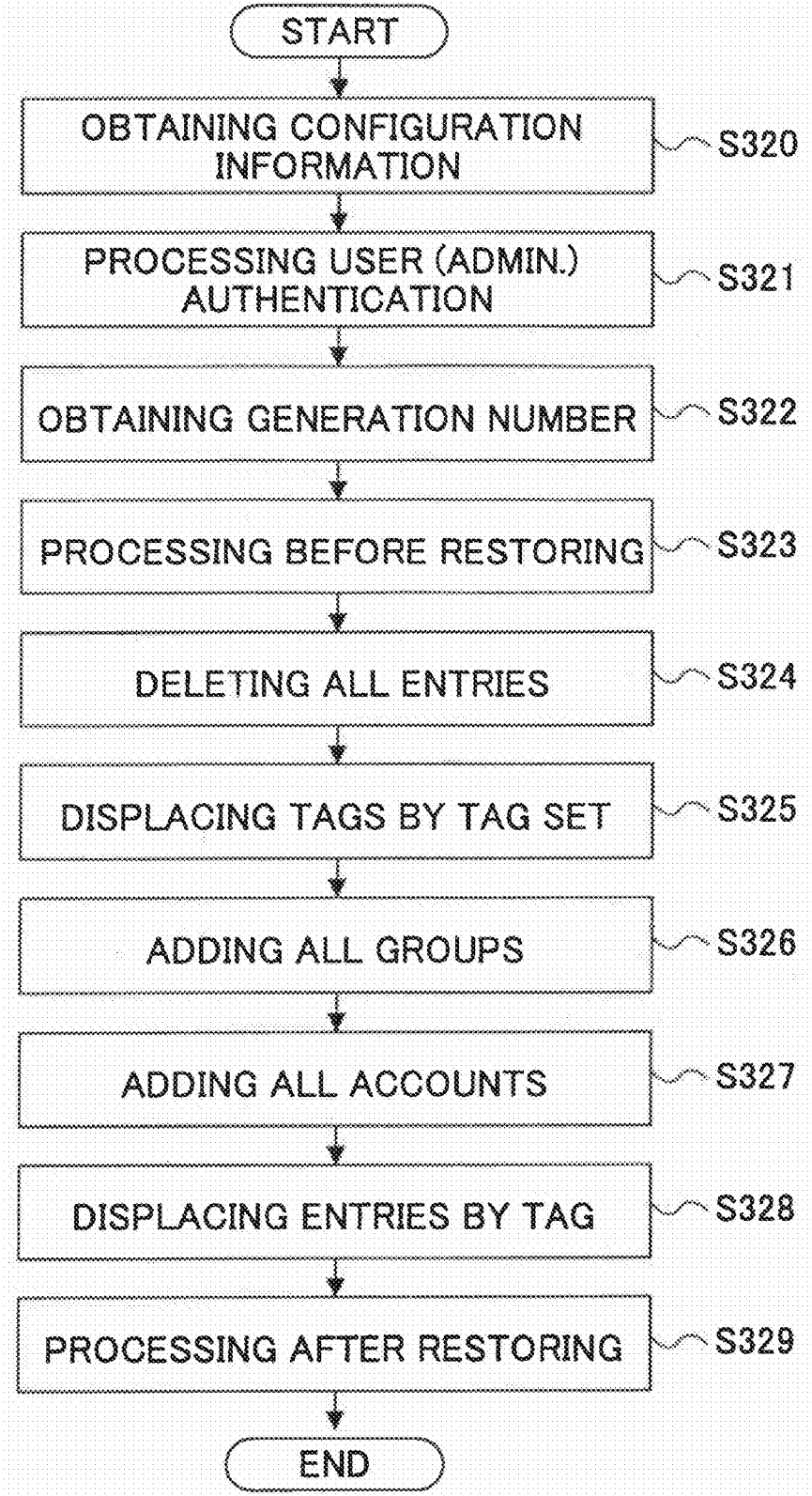

FIG.90 beginRestore

| | PARAMETER | DATA TYPE | DESCRIPTION | NOTE |
|---|---|---|---|---|
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| OUTPUT | returnValue | ENUMERATION | ENDING STATE | INDICATING NORMAL COMPLETION, SYSTEM BUSY, AND SO FORTH. |
| | generation_inout | NONNEGATIVE INTEGER | GENERATION NUMBER | USED TO DETERMINE WHETHER USER INFORMATION IS UPDATED BY OTHER. |

FIG.91

| endRestore | | | | |
|---|---|---|---|---|
| | PARAMETER | DATA TYPE | DESCRIPTION | NOTE |
| INPUT | ticket | BINARY | AUTHENTICATION INFORMATION | INDICATING USER IS AUTHENTICATED. |
| | generation_inout | NONNEGATIVE INTEGER | GENERATION NUMBER | USED TO DETERMINE WHETHER USER INFORMATION IS UPDATED BY OTHER. |
| | returnValue | ENUMERATION | ENDING STATE | INDICATING NORMAL COMPLETION, SYSTEM BUSY, AND SO FORTH. |
| OUTPUT | generation_inout | NONNEGATIVE INTEGER | GENERATION NUMBER | USED TO DETERMINE WHETHER USER INFORMATION IS UPDATED BY OTHER. |

FIG.92

FILE(F) EDIT(E) DISPLAY(V) HELP(H)

CHARGE INFO | USER RESTRICTION | E-MAIL INFO | FAX INFO

| ABBREV. ID | NAME | ADDRESS | CONDITION |
|---|---|---|---|
| 0123 | SAI | tanaka@xxx.xxx.xxx | |
| 0101 | MARU | aaa@xxx.xxx.xxx | |
| 0120 | FREE | bbb@xxx.xxx.xxx | |
| 7890 | AIU | ddd@xxx.xxx.xxx | |
| 8191 | TEST | eee@xxx.xxx.xxx | |
| 3131 | ULT | fff@xxx.xxx.xxx | |

METHOD OF CONTROLLING USER INFORMATION AND INFORMATION PROCESSING APPARATUS

CROSS REFERENCE TO RELATED APPLICATIONS

The present application is a divisional of Ser. No. 10/372,798, filed Feb. 26, 2003 now abandoned, of which claims priority to Japanese Patent Application No. 2002-050539 filed on Feb. 26, 2002, Japanese Patent Application No. 2002-050540 filed on Feb. 26, 2002, Japanese Patent Application No. 2002-050547 filed on Feb. 26, 2002, Japanese Patent Application No. 2003-039974 filed on Feb. 18, 2003, Japanese Patent Application No. 2003-039975 filed on Feb. 18, 2003, Japanese Patent Application No. 2003-039976 filed on Feb. 18, 2003, Japanese Patent Application No. 2003-039977 filed on Feb. 18, 2003, Japanese Patent Application No. 2003-039978 filed on Feb. 18, 2003 and Japanese Patent Application No. 2003-039979 filed on Feb. 18, 2003, the entire contents of which are hereby incorporated by reference.

BACKGROUND OF THE INVENTION

1. Field of the Invention

The present invention generally relates to a method of controlling user information and an information processing apparatus, and more particularly, to a method of controlling user information in which the user information is provided to a plurality of application programs, and to the information processing apparatus using the same.

2. Description of the Related Art

An information processing apparatus such as a personal computer and an image forming apparatus can provide users with various information processing functions by executing one or more software programs corresponding to various functions. The information processing apparatus is often connected to other devices via a network and can distribute image data, for example, to the other devices. The information processing apparatus stores therein user information such as distribution addresses, user restrictions, and charges.

As an example of the information processing apparatus, an image forming apparatus is a system that functions as a copier, a printer, a facsimile, and a scanner (hereinafter referred to as a multifunctional apparatus). The multifunctional apparatus is provided with a display unit, a printing unit, and an image capture unit in the system, and is further provided with software programs each corresponding to the function of a copier, a printer, a facsimile, or a scanner. A user can use the multifunctional apparatus as a copier, a printer, a facsimile, or a scanner by switching the software programs.

The image forming apparatus is connected with other image forming apparatuses and computers via a network and distributes the image data, for example, to the other image forming apparatuses and computers. The image forming apparatus stores therein user information such as addresses and user restriction/charges.

The distribution address information is used to manage addressees and senders. The distribution address information is not so often updated; it is relatively easily backed up. The number of entries is usually large because the addresses of users that do not directly use the information processing apparatus or the image forming apparatus are included in the distribution address information.

On the other hand, the user restriction information and the charge information are used to manage the authorization (user restriction) of various functions and the usage (the number of printed pages, for example) of the authorized functions by respective users. The user restriction/charge information is updated frequently whenever the information processing apparatus is used; the creating of its backup copy is not easy. Only users who directly use the information processing apparatus or the image forming apparatus are managed using the user restriction/charge information. Therefore, the number of users is relatively small.

As described above, the distribution address information and the user restriction/charge information are different in the easiness of backup and the number of users to be managed thereby. Due to this difference, the information storage apparatuses suitable for the respective information sets are also different. The distribution address information requires an information storage apparatus with a large capacity even at the sacrifice of speed and reliability. The user restriction/charge information, however, requires an information storage apparatus of high speed and high reliability at the sacrifice of cost and capacity.

Conventionally, an information processing apparatus and an image forming apparatus store the distribution address information in a hard disk drive, and store the user restriction/charge information in a non-volatile random access memory (RAM).

The conventional information processing apparatus is provided with one or more application software programs corresponding to each of various information processing functions. Each application program, however, manages the distribution address information separately. The conventional image forming apparatus is provided with application programs corresponding to user services of intrinsic image forming processing such as printing, copying, scanning, and transmitting facsimile. Each application program, however, manages the distribution address information separately.

The separate management of user information thus requires hardware resources otherwise unnecessary, and increases the risk of bugs in the application programs.

Additionally, the distribution address information and the user restriction/charge information need to be stored and controlled in a hard disk drive (HDD) or a non-volatile random access memory (RAM) so that the application programs can access these information sets.

A system initialization module and so forth updates the distribution address information. When registering, updating, and accessing the distribution address information or the user restriction/charge information, the system initialization module is required to determine in which, the HDD or the non-volatile RAM, the distribution address information and the user restriction/charge information are stored so that the system initialization module can designate appropriate one.

Further, in the case of the conventional information processing apparatus and the image forming apparatus, a user is required to directly operate an operation panel provided on the information processing apparatus and the image forming apparatus to access or update the distribution address information and the user restriction/charge information.

Accordingly, the user needs to go to the place where the information processing apparatus and the image forming apparatus are placed in order to access and update the distribution address information and the user restriction/charge information.

Additionally, since the size of the operation panels differs, the amount of information displayed on the operation panel changes apparatus by apparatus. The operation panel provided on an image forming apparatus is usually small. Accordingly, depending on the size of the operation panel, the amount of information that can be displayed on the operation panel is sometimes not large enough.

Furthermore, the user is required to follow a predetermined format and order of the information processing apparatus and the image forming apparatus so as to access or update the distribution address information and the user restriction/charge information.

The user needs to make a substantial effort to directly operate the operation panel and so forth provided to the information processing apparatus and the image forming apparatus so as to access the distribution address information and the user restriction/charge information.

SUMMARY OF THE INVENTION

Accordingly, it is a general object of the present invention to provide a novel and useful method of controlling user information, and more particularly, to provide a method of controlling user information in which the user information is centralized and shared by a plurality of application programs.

Another object of the present invention is to provide a method of controlling user information in which the user information can be updated without designating where the user information is stored.

Yet another object of the present invention is to provide a method of controlling the user information with which the user can easily operate with little effort.

To achieve one of the above objects, a method of controlling user information for an information processing apparatus, according to the present invention, includes the steps of a process of an application program requesting a user information control unit to obtain an item of said user information, and said user information control unit providing the obtained item of said user information to said process.

The user information control unit obtains the user information requested by the process of the application program and provides the user information to the process. Accordingly, the user information can be shared by the application programs and centrally controlled.

According to another aspect of the present invention, an information processing apparatus includes a plurality of information storage units storing user information, and a user information control unit that, in response to a request from a process of an application program, obtains said user information from said information storage units and provides the obtained user information to said process of said application program.

According to yet another aspect of the present invention, a method of controlling user information for an information processing apparatus, includes the steps of a system initialization module requesting a user information control unit to update user information, and said user information control unit updating, in response to the request from said system initialization module, said user information.

The user information control unit updates the user information in compliance with the request from the system initialization module. Accordingly, the system initialization module can update the user information without designating in which information storage unit the user information is stored. The user information is centrally controlled.

According to yet another aspect of the present invention, an information processing apparatus includes a plurality of information storage units storing user information therein, and a user information control unit that updates, in response to a request from a system initialization module, said user information stored in said information storage unit.

According to yet another aspect of the present invention, a method of controlling user information for an information processing apparatus includes the steps of a user information control unit receiving a request in connection with user information from an external control apparatus connected to said information processing apparatus via a network, and said user information control unit processing said request using predefined functions.

The user information can be controlled using the external control apparatus connected to the information processing apparatus via the network. Accordingly, the operator can control the user information watching a large screen provided to the external control apparatus instead of a small operation panel provided to the information processing apparatus. The user can handle the user information flexibly and easily. The operator does not need to go to the place where the information processing apparatus is placed. Additionally, the user information can be shared with another information processing apparatus.

According to yet another aspect of the present invention, an information processing apparatus includes a plurality of information storage units storing user information therein, and a user information control unit that receives a request in connection with said user information stored in the information storage units from an external control apparatus through a network and handles said user information using a predefined function corresponding to said request.

According to yet another aspect of the present invention, a computer program that causes a computer to control user information includes the steps of requesting an information processing apparatus connected via a network to transmit said user information using a predetermined protocol for exchanging messages expressed in a description language, receiving said user information from said information processing apparatus in compliance with said protocol, displaying a screen based on the received user information, and requesting, in response to a request to update said user information input by a user, said information processing apparatus to update said user information using said protocol.

The computer program can cause a computer to function as the external control apparatus that can remote control the user information stored in the information processing apparatus.

Other objects, features, and advantages of the present invention will become more apparent from the following detailed description when read in conjunction with the accompanying drawing.

BRIEF DESCRIPTION OF THE DRAWINGS

FIG. 6 is a table showing user restriction/charge information according to an embodiment of the present invention;

FIG. 7 is a table showing distribution address information according to an embodiment of the present invention;

FIG. 10 is a schematic diagram showing a tag set and tags according to an embodiment;

FIG. 14 shows an example of API for obtaining configuration information according to an embodiment;

FIG. 15 is a schematic diagram showing the data structure of configuration information according to an embodiment;

FIG. 17 shows an example of an API for registering functions to be used according to an embodiment;

FIG. 19 shows an example of an API for obtaining a tag set according to an embodiment;

FIG. 20 is a schematic diagram showing the tag set data structure according to an embodiment;

FIG. 21 shows an example of an API for obtaining tag information according to an embodiment;

FIG. 22 is a schematic diagram showing the data structure of tag information according to an embodiment;

FIG. 23 is a flow chart showing an obtaining operation of tag entries in step S113 of FIG. 9 according to an embodiment;

FIG. 24 shows an example of an API for obtaining tag entries according to an embodiment;

FIG. 25 is a schematic diagram showing the data structure of tag entries according to an embodiment;

FIG. 27 shows an example of an API for obtaining entry control numbers based on entry index numbers according to an embodiment;

FIG. 28 shows an example of an API for obtaining tags to which a tag entry is attached based on an entry control number according to an embodiment;

FIG. 29 shows an example of an API for obtaining entry position according to an embodiment;

FIG. 30 shows an example of an API for obtaining mail information according to an embodiment;

FIG. 31 shows an example of an API for obtaining sender authentication information according to an embodiment;

FIG. 32 shows an example of an API for obtaining user restriction information according to an embodiment;

FIG. 33 shows an example of an API for obtaining e-mail group information according to an embodiment;

FIG. 34 shows an example of an API for searching entries according to an embodiment;

FIG. 41 shows an example of an API for adding a new entry according to an embodiment;

FIG. 42 shows an example of an API for setting a tag to which an entry is attached according to an embodiment;

FIG. 43 shows an example of an API for setting a usercode according to an embodiment;

FIG. 44 shows an example of an API for setting a mail address according to an embodiment;

FIG. 45 shows an example of an API for checking and obtaining an index number according to an embodiment;

FIG. 46 shows an example of an API for obtaining groups to which an entry is included according to an embodiment;

FIG. 47 shows an example of an API for updating an entry according to an embodiment;

FIG. 48 shows an example of an API for deleting an entry according to an embodiment;

FIG. 49 shows an example of an API for updating a tag according to an embodiment;

FIG. 50 shows an example of an API for moving the position of a tag entry according to an embodiment;

FIG. 51 shows an example of an API for setting sender authentication information according to an embodiment;

FIG. 52 shows an example of an API for setting a mail group according to an embodiment;

FIG. 53 shows an example of an API for obtaining the number of registered entries according to an embodiment;

FIG. 54 is an example of an API for obtaining the number of registered accounts according to an embodiment;

FIG. 55 is an example of an API for obtaining the number of registered groups according to an embodiment;

FIG. 56 is an example of an API for obtaining the number of registered mail addresses according to an embodiment;

FIG. 57 is an example of an API for obtaining the number of registered usercodes according to an embodiment;

FIGS. 60A-60C show an example of a web service description in compliance with WSDL according to an embodiment;

FIG. 62 shows input/output parameters used in a web service for obtaining configuration information according to an embodiment;

FIG. 63 shows the data structure of the configuration information according to an embodiment;

FIG. 64 shows input/output parameters used in a web service for authenticating a user or an administrator;

FIG. 65 shows input/output parameters used in a web service for obtaining a generation number;

FIG. 66 shows input/output parameters used in a web service for obtaining a tag set;

FIG. 67 shows the data structure of a tag set according to an embodiment;

FIG. 68 shows input/output parameters used in a web service for obtaining a tag according to an embodiment;

FIG. 69 shows the data structure of tag information according to an embodiment;

FIG. 70 shows input/output parameters used in a web service for obtaining tag entries according to an embodiment;

FIG. 71 shows an example of filter according to an embodiment;

FIG. 72 shows the data structure of an entry according to an embodiment;

FIG. 73 shows input/output parameters used in a web service for obtaining account information according to an embodiment;

FIG. 74 shows the data structure of an account according to an embodiment;

FIG. 75 shows the data structure of mail address information according to an embodiment;

FIG. 76 shows the data structure of facsimile number information according to an embodiment;

FIG. 77 shows the data structure of usercode information according to an embodiment;

FIG. 78 shows input/output parameters used in a web service for obtaining group information according to an embodiment;

FIG. 79 shows the data structure of group information according to an embodiment;

FIG. 80 shows the data structure of mail group information according to an embodiment;

FIG. 81 shows the data structure of facsimile group information according to an embodiment;

FIG. 82 shows input/output parameters used in a web service for displacing tags in a tag set according to an embodiment;

FIG. 83 shows input/output parameters used in a web service for displacing entries in a tag according to an embodiment;

FIG. 84 shows input/output parameters used in a web service for deleting entries having a designated Id number according to an embodiment;

FIG. 85 shows input/output parameters used in a web service for adding a new account according to an embodiment;

FIG. 86 shows input/output parameters used in a web service for updating account information according to an embodiment;

FIG. 87 shows input/output parameters used in a web service for adding a new group according to an embodiment;

FIG. 88 shows input/output parameters used in a web service for updating group information according to an embodiment;

FIG. 89 is a flow chart showing a restoring operation of the user information using the remote control according to an embodiment;

FIG. 90 shows input/output parameters used in a web service for processing before restoring according to an embodiment;

FIG. 91 shows input/output parameters used in a web service for processing after restoring according to an embodiment; and FIG. 92 is a schematic diagram showing a screen according to an embodiment.

DETAILED DESCRIPTION OF THE PREFERRED EMBODIMENTS

The preferred embodiments of the present invention will be described in detail by reference to the drawings.

Figure 1:
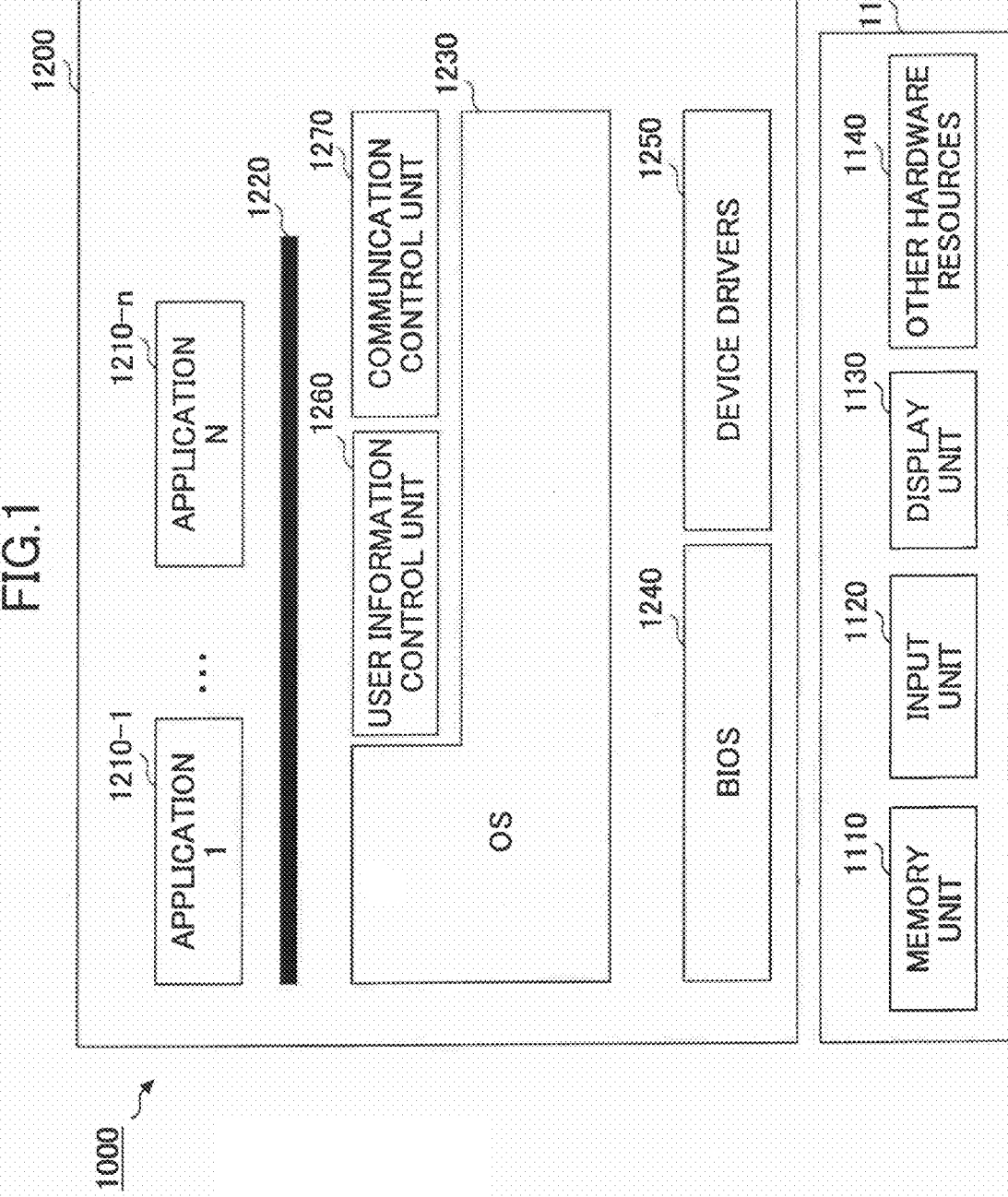
FIG. 1 is a schematic diagram showing an information processing apparatus according to an embodiment of the present invention.

FIG. 1 is a schematic diagram showing an information processing apparatus according to an embodiment of the present invention. The information processing apparatus 1000 includes hardware resources 1100 and software programs 1200.

The hardware resources 1100 include a memory unit 1110, an input unit 1120, a display unit 1130, and other hardware resources 1140. The software programs include application programs 1210-1 through **1210-*n*, OS 1230 such as UNIX (trade mark), BIOS 1240, device drivers 1250, a user information control unit 1260, a communication control unit 1270**, and so forth.

When the power is turned on, the information processing apparatus 1000 reads OS 1230 from a secondary storage unit to the memory unit 1110, and executes the OS 1230. When the power is turned on or an instruction is given from an operator, the information processing apparatus 1000 reads an application program 1210-1 through **1210-*n* from the secondary storage unit to the memory unit 1110, and executes the read application program 1210-1 through 1210-*n***.

The application programs 1210-1 through **1210-*n* cause the information processing apparatus 1000 to perform various information processing operations. BIOS 1240 is a computer program that controls the hardware resources 1100. The device drivers 1250 are computer programs that drive peripheral devices included in the hardware resources 1100**.

OS 1230, the user information control unit 1260, and the communication control unit 1270 communicate with the application programs 1210-1 through **1210-*n* via application program interface (API) 1220. API 1220 includes predefined functions through which the application 1210-1 through 1210-*n* can give instructions to OS 1230 and the user information control unit 1260**.

The user information control unit 1260 controls the user information. The communication control unit 1270 controls the communication with external control apparatuses (to be described later) connected with the information processing apparatus 1000 through a network.

The user information control unit 1260 determines the information storage apparatus in which the user information required by the application program 1210-1 through **1210-*n* is stored and provides the user information stored in the determined information storage apparatus to the application program 1210-1 through 1210-*n***.

OS 1230 controls processes created by the execution of the application programs 1210-1 through **1210-*n*, the user information control unit 1260, and the communication control unit 1270 in parallel. OS 1230 gives instructions to the hardware resources 1100 through BIOS 1240 and the device drivers 1250**.

Figure 2:
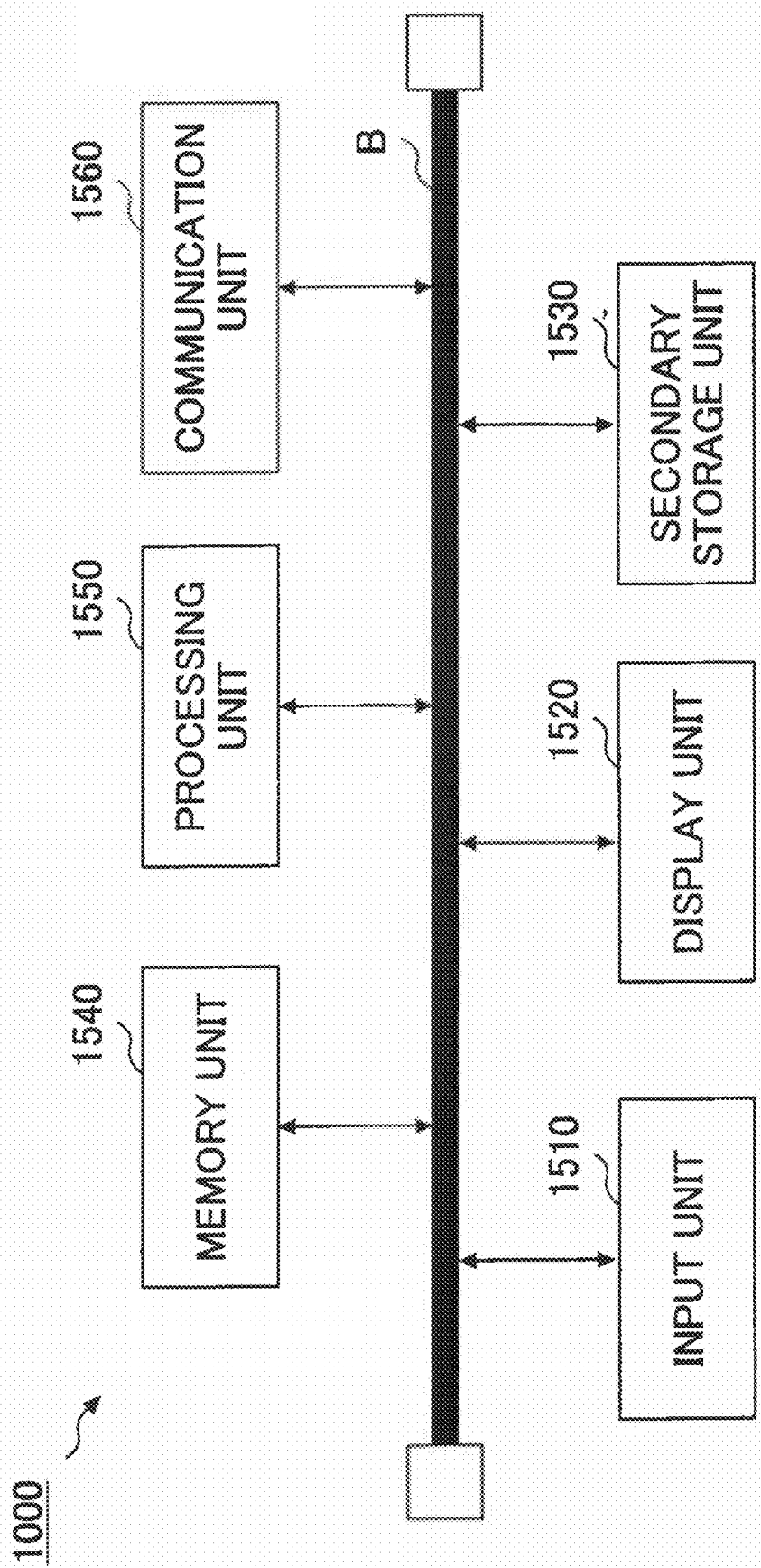
FIG. 2 is a schematic diagram showing the hardware structure of the information processing apparatus according to an embodiment of the present invention.

The hardware configuration of the information processing apparatus 1000 will be described below. FIG. 2 is a schematic diagram showing the hardware configuration of the information processing apparatus 1000 according to an embodiment. The information processing apparatus 1000 is configured by an input unit 1510, a display unit 1520, a secondary storage unit 1530, a memory unit 1540, a processing unit 1550, and a communication unit 1560 all of which are mutually connected via a bus B.

The input unit 1510 includes input devices such as a keyboard and a mouse. An operator can give the information processing apparatus 1000 various instructions by operating the input unit 1510. The display unit 1520 displays various windows and data for the operator. The secondary storage unit 1530 stores therein computer programs and various files and data that are needed for the performance of the computer programs. The communication unit 1560 communicates with an external control apparatus to be described later that is connected through a network.

The memory unit 1540 stores the computer programs retrieved from the secondary storage unit 1530 when the power of the information processing apparatus is turned on. The processing unit 1550 executes the computer programs stored in the memory unit 1540.

When the information processing apparatus 1000 is turned on, computer programs read from the secondary storage apparatus 1530 are stored in the memory unit 1540. The processing unit 1550 runs the computer programs stored in the memory unit 1540.

The information processing apparatus 1000 is connected to other computers and distributes image information and so forth to the other computers. The information processing apparatus 1000 provided with such a distribution function usually stores the distribution address information and the user restriction/charge information as user information. The information processing apparatus 1000 that is not provided with such a distribution function may store only the user restriction/charge information.

As an example of the information processing apparatus 1000 according to an embodiment of the present invention, an image forming apparatus 1 will be described below. The image forming apparatus is provided with various functions such as those of a printer, a copier, a facsimile, and a scanner, and therefore is called a multifunctional apparatus.

Figure 3:
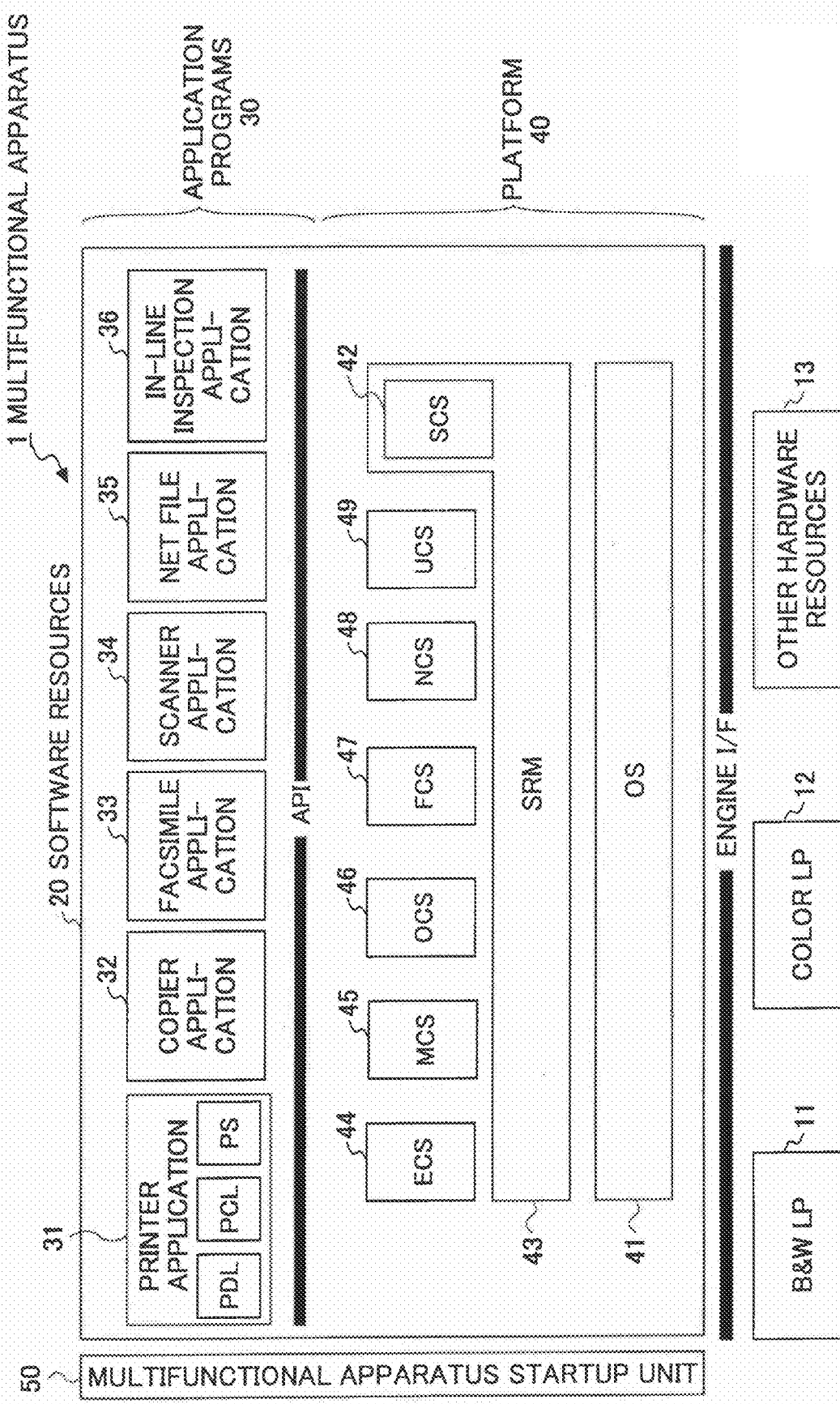
FIG. 3 is a schematic diagram showing a multifunctional apparatus according to an embodiment of the present invention.

FIG. 3 is a schematic diagram showing a multifunctional apparatus 1 according to an embodiment of the present invention. The multifunctional apparatus 1 includes the following: a black & white laser printer 11, a color laser printer 12, other hardware resources 13, software resources 20, and a multifunctional apparatus startup unit 50. The software resources 20 further include application programs 30 and a platform 40.

The platform 40 further includes the following: control services 42, 44-49 that interpret processing requests from the application programs 30 and control one or more hardware resources, a system resource manager (SRM) 43 that controls one or more hardware resources and arbitrates the requests from the control services, and operating system (OS) 41.

The control services include one or more service modules such as a system control service (SCS) 42, an engine control service (ECS) 44, a memory control service (MCS) 45, an operation panel control service (OCS) 46, a facsimile control service (FCS) 47, a network control service (NCS) 48, and a user control service 49.

The platform 40 has an application program interface (API) that can receive processing requests from the application programs 30 by predefined functions.

The OS 41 is, for example, UNIX (trade mark). The OS 41 executes the software programs of the platform 40 and the application programs 30 as processes in parallel.

The process of SRM 43 controls the system and manages resources together with SCS 42. For example, the process of SRM 43 arbitrates requests from an upper rank layer, to use hardware resources such as engines, the memory unit, files stored in a hard disk drive (HDD), host input/output (I/O) (Centronics interface, network interface, IEEE 1394 interface, RS232C interface, for example), and controls their execution.

In response to a request from the upper rank layer, SRM 43 determines whether the requested hardware resource is in use and, if not, informs the upper rank layer that the requested hardware resource is available for use. SRM 43 schedules the use of hardware resources based on the requests from the upper rank layer. SRM 43 also directly controls the paper transportation and the image forming of the printer engine, memory reservation, and file generation.

The process of SCS 42 performs application administration, operational unit control, system screen display, LED display, resource administration, interruption application control, and so forth.

The process of ECS 44 controls the engines of the black & white laser printer 11, the color laser printer 12, and the hardware resource 13.

The process of MCS 45 reserves and discharges image memory, controls the hard disk drive (HDD), and compresses and decompresses the image data.

The process of OCS 46 controls the operation panel that helps the multifunctional apparatus 1 to communicate with the operator.

The process of FCS 47, in response to a request from the application layer of the system controller, transmits and receives facsimile through PSTN or ISDN, for example, registers and retrieves various facsimile data stored in the backup SRAM (BKM), reads documents, prints received facsimile, and performs multifunctional communication.

The process of NCS 48 provides common services to applications that require communication through a network. The process of NCS 48 distributes data received from the network to corresponding applications programs and intermediates the transmission of data from an application program to the network.

The process of UCS 49 controls the user information by determining the information storage apparatus storing the requested user information and providing the user information from the determined information storage apparatus to the application programs.

The application programs 30 provides users with various user services such as those of a printer, a copier, a facsimile, and a scanner. The application programs 30 includes the following: a printer application 31 that causes the multifunctional apparatus 1 to function as a printer supporting page description languages (PDL, PCL) and postscript (PS), for example, a copier application 32, a facsimile application 33, a scanner application 34, a network file application 35, and in-line inspection application 36.

The multifunctional apparatus startup unit 50 performs at first when the multifunctional apparatus 1 is turned on and activates the application programs 30 and the platform 40. For example, the multifunctional apparatus startup unit 50 reads the control services and the application programs from a flash memory (to be described later) and transfers them to a memory region reserved in SRAM or SDRAM, for example, for execution.

Figure 4:
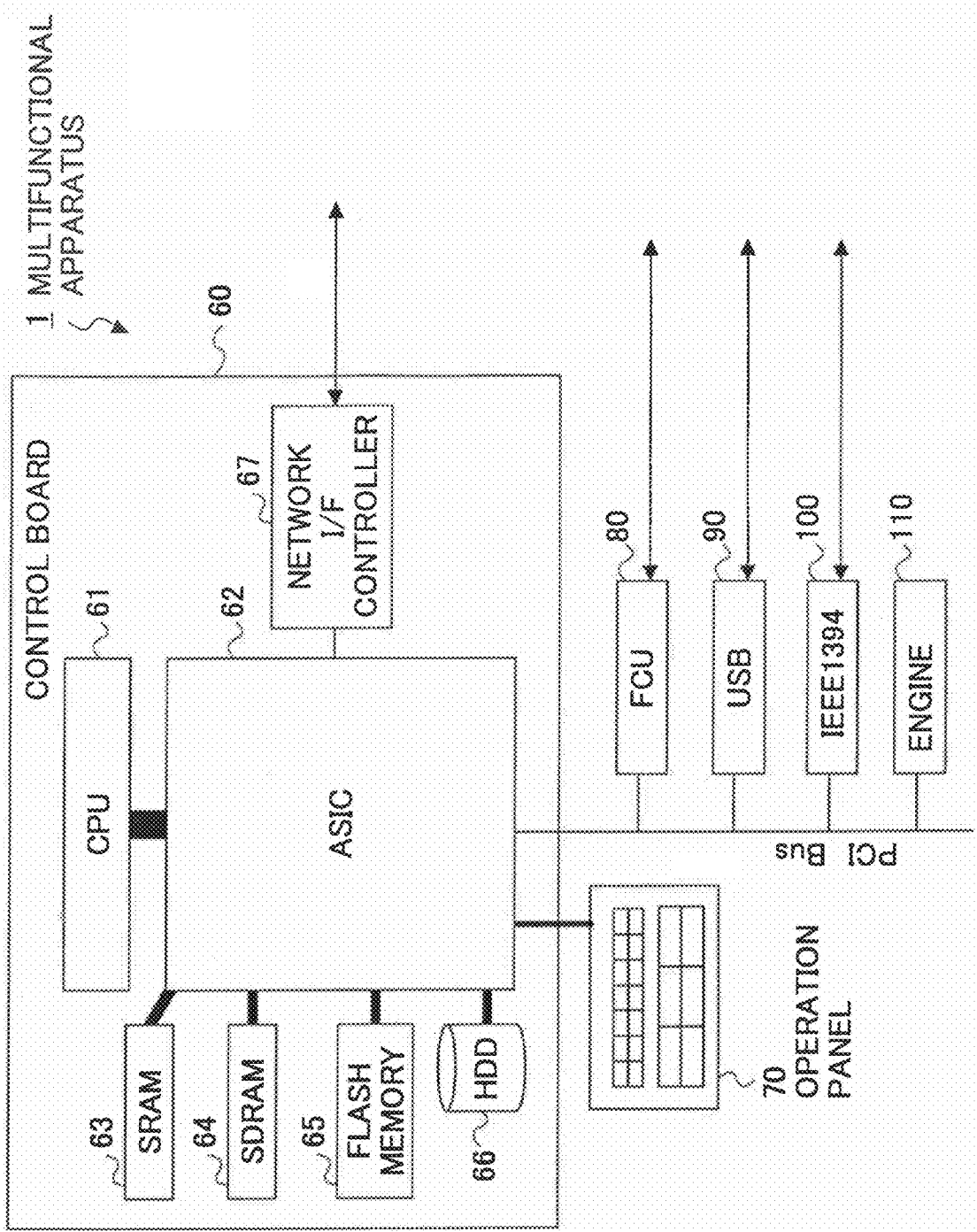
FIG. 4 is a schematic diagram showing the hardware structure of the multifunctional apparatus according to an embodiment of the present invention.

FIG. 4 is a schematic diagram showing the hardware configuration of a multifunctional apparatus according to an embodiment. The multifunctional apparatus 1 of FIG. 4 is provided with the following: a control board 60, an operation panel 70, a facsimile control unit (FCU) 80, a USB interface 90, an IEEE 1394 interface 100, and an engine unit 110. FCU 80 includes another memory unit that temporarily stores facsimile data received while the multifunctional apparatus 1 is turned off.

The operation panel 70 is directly connected to ASIC 66 of the control board 60. FCU 80, USB interface 90, IEEE1394 interface 100, and the engine unit 110 are connected to ASIC 62 of the control board 60 through a PCI bus and so forth.

The control board 60 is further provided with a CPU 61, a static RAM (SRAM) 63, a Synchronous DRAM (SDRAM) 64, a flash memory 65, an HDD 66, a network interface controller 67 that are connected to the ASIC 62.

CPU 61 controls the entire system of the multifunctional apparatus 1. CPU 61 and ASIC 66 are connected each other through NB that is a CPU chip set. As described above, even if the information of the interface of CPU 61 is not available, ASIC 66 can be connected to CPU 61 through NB.

CPU 61 controls the entire operation of the functional apparatus 1. CPU 61 executes processes of SCS 42, SRM 43, ECS 44, MCS 45, OCS 46, FCS 47, and NCS 48 that are included in the platform 40 under the control of the OS 41. CPU 61 further runs the printer application 31, the copier application 32 the facsimile application 33, the scanner application 34, the net file application 35, and the in-line inspection application 36 that are included in the application 30.

ASIC 62 is an integrated circuit of which hardware is designed for image processing. The virtual memory spaces of the kernel and the processes of the application programs are mapped over the physical memory space provided by the SRAM 63 and the SDRAM 64.

The flash memory 65 is a non-volatile random access memory that stores therein the application programs of the application 30, the control services of the platform 40, computer programs such as SRM 43, and the user restriction/charge information.

HDD 66 is a storage device that stores therein image data, computer programs, font data, form data, and the distribution address information.

The operation panel 70 is an input device with which the operator can operate the multifunctional apparatus 1, and at the same time, is a display device through which the system displays information to the operator.

The multifunctional apparatus 1 may be connected to another multifunctional apparatus, a computer, and so forth through a network and thereby distribute image data and so forth. The multifunctional apparatus 1 with such a distribution function stores therein the user information such as the distribution address information and the user restriction/charge information. The multifunctional apparatus 1 without such a distribution function may store only the user restriction/charge information therein.

The method of controlling user information according to the present invention will be described using the multifunctional apparatus 1 as an example of the information processing apparatus 1000 according to the present invention.

First Embodiment

Figure 5:
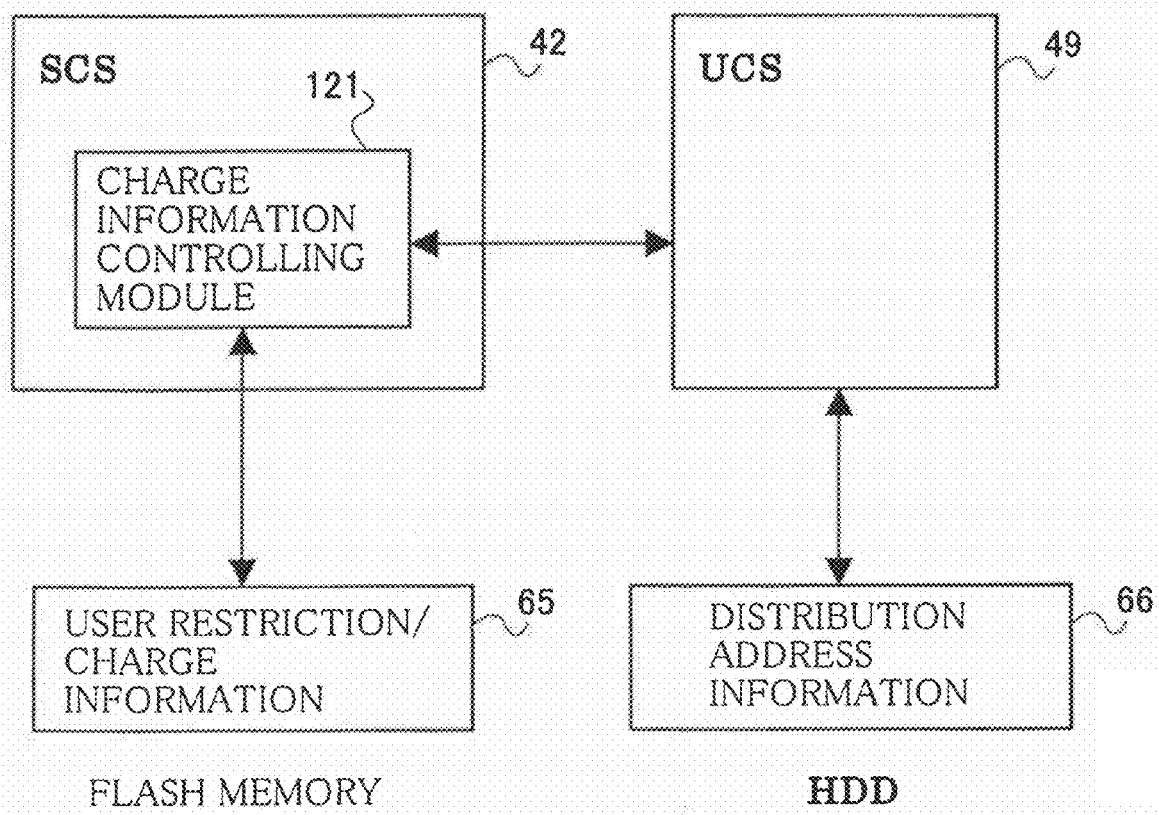
FIG. 5 is a schematic diagram for explaining a method of controlling user information according to an embodiment of the present invention.

FIG. 5 is a schematic diagram for explaining the method of controlling user information according to an embodiment of the present invention. The user restriction/charge information stored in the flash memory 65 is used for controlling the authorization of various functions as entitled to each user and the quantity of authorized function consumed by each user. For example, the user restriction/charge information is configured as showed in FIG. 6.

FIG. 6 is a table showing the user restriction/charge information. The user restriction/charge information showed in FIG. 6 includes data items such as Identification No., Registration No., user name, user code, authorization (user restriction) for the copying function, the number of copied pages, authorization (user restriction) for distributing, and the number of distributed pages. The user restriction/charge information stored in the flash memory 65 is controlled by the charge information controlling module 121 included in the SCS 42.

The parameters of various services, modules, and application programs are also stored in the flash memory 65 and are controlled by the system initializing module (not showed) included in the SCS 42.

The distribution address information stored in the HDD 66 is used to control the addressees and the senders of distribution information and is configured as showed in FIG. 7. FIG. 7 is a table showing the distribution address information, for example. The distribution address information of FIG. 7 includes data items such as identification No., registration No., user name, e-mail address, and the authorization (user restriction) for sending. The distribution address information stored in the HDD 66 is controlled by the USC 49.

The UCS 49 directly controls the distribution address information stored in the HDD 66 and, at the same time, indirectly controls the user restriction/charge information stored in the flash memory 65 through the charge information controlling module 121.

In the case of the multifunctional apparatus 1 without the distribution function, no distribution address information is stored in the HDD 66. Even in this case, the multifunctional apparatus 1 can have the same interface as that of the multifunctional apparatus 1 with the distribution function because the UCS 49 can indirectly control the user restriction/charge information stored in the flash memory 65 through the charge information controlling module 121.

The multifunctional apparatus showed in FIG. 5, stores the user restriction/charge information in the flash memory 65 and the distribution address information in the HDD 66. The user restriction/charge information, the distribution address information, or both may be stored in the memory unit included in the FCU 80. Alternatively, the portion of the user restriction/charge information or the portion of the distribution address information may be stored in the memory unit included in the FCU 80.

The case where the facsimile application 33, as an example of the application programs 30, accesses the user information through the UCS 49 will be described by reference to the drawings.

Figure 8:
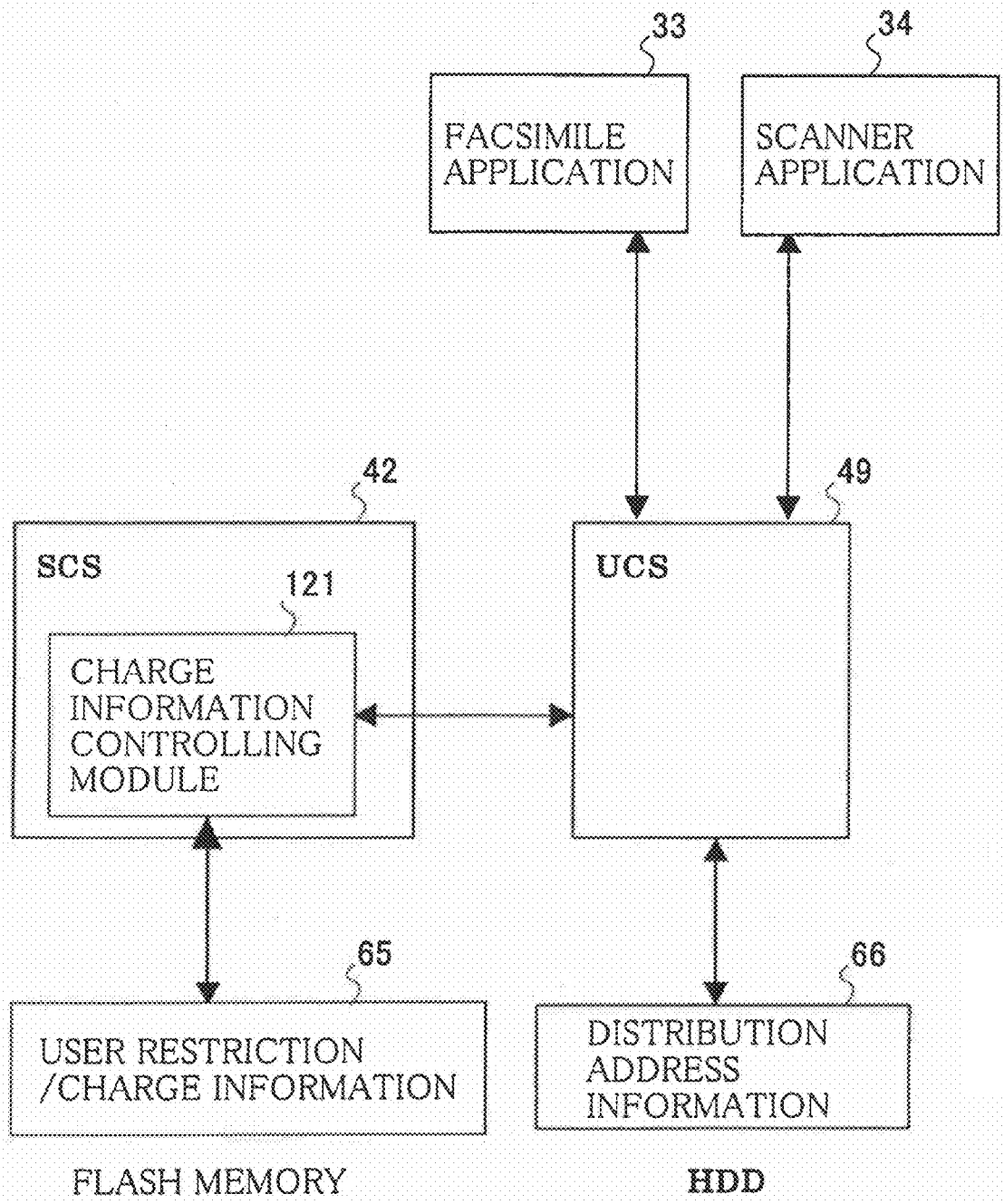
FIG. 8 is a schematic diagram for explaining an accessing operation to user information according to an embodiment.

FIG. 8 is a schematic diagram for explaining the access of the facsimile application 33 to the user information. The facsimile application 33, as a client of the UCS 49, requests for access to the user information through the API provided by the UCS 49.

The UCS 49 determines in which, the flash memory 65 or the HDD 66, the user information requested by the facsimile application 33 is stored. Then, the UCS 49 obtains the requested user information from either the flash memory 65 or the HDD 66, and provides the obtained user information to the facsimile application 33.

In particular, when the facsimile application 33 request for access to the distribution address information, the UCS 49 obtains a requested item of the distribution address information from the HDD 66 and provides the obtained item to the facsimile application 33. When the facsimile application 33 requests for access to the user restriction/charge information, the UCS 49 obtains the requested item of the user restriction/charge information from the flash memory 65 through the charge information controlling module 121 and provides the obtained item to the facsimile application 33.

Accordingly, the facsimile apparatus 33 can obtain a desired item of the user information from the UCS 49 without designating where the desired item of the user information is stored. The initializing process to be performed by the facsimile application 33 will be described below.

The UCS 49, as a server, creates a thread and opens a socket to wait for a request. The facsimile application 33, as a client, creates a thread and opens a socket to wait for an event. The facsimile application 33 registers its subscription through the socket that the UCS 49 opens.

The inter-process communication between the request from the facsimile application 33 received through the socket of the UCS 49 and the event from the UCS 49 received through the socket of the facsimile application 33 enables the facsimile application 33 and the UCS 49 to operate in collaboration with each other.

Figure 9:
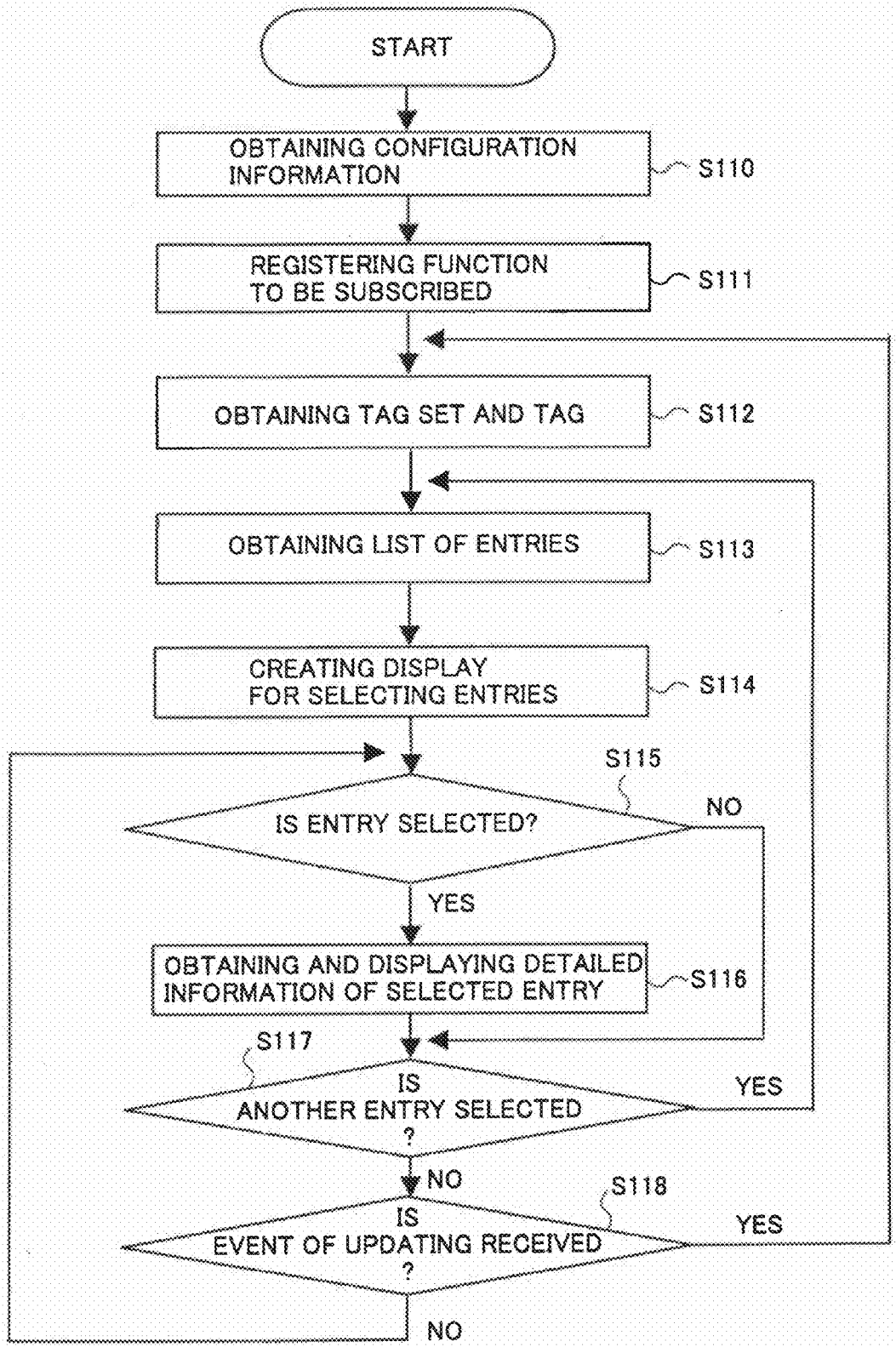
FIG. 9 is a flow chart showing an accessing operation to distribution address information according to an embodiment.

The operation in which the scanner application 34 displays the distribution address information on the operation panel 70 will be described as an example by reference to the drawings. FIG. 9 is a flow chart showing the operation in which an application program accesses the distribution address information.

The scanner application 34 obtains configuration information from UCS 49 using the API (step S110). The configuration information is information about the configuration of the UCS 49. The configuration information contains information about incorporation and parameters of the UCS 49 and the charge information controlling module 121. This step S110 will be described in more detail later.

Subsequently to the step S110, the scanner application 34 determines usable functions from the obtained configuration information and registers the functions to be used using the API at the UCS 49 (step S111). After this registration in the UCS 49, of the functions to be used, the scanner application 34 is automatically notified of the updates of the user information.

For example, if e-mail address information is usable, the scanner application 34 registers the e-mail address information as a function to be used, in the UCS 49. Subsequently, when the e-mail address information is updated, the UCS 49 informs the scanner application 34 of the update. The step S111 will be described in more detail later.

Next to the step S111, the scanner application 34 obtains tag set information and tag information from the UCS 49 through the API (step S112).

Figure 10:
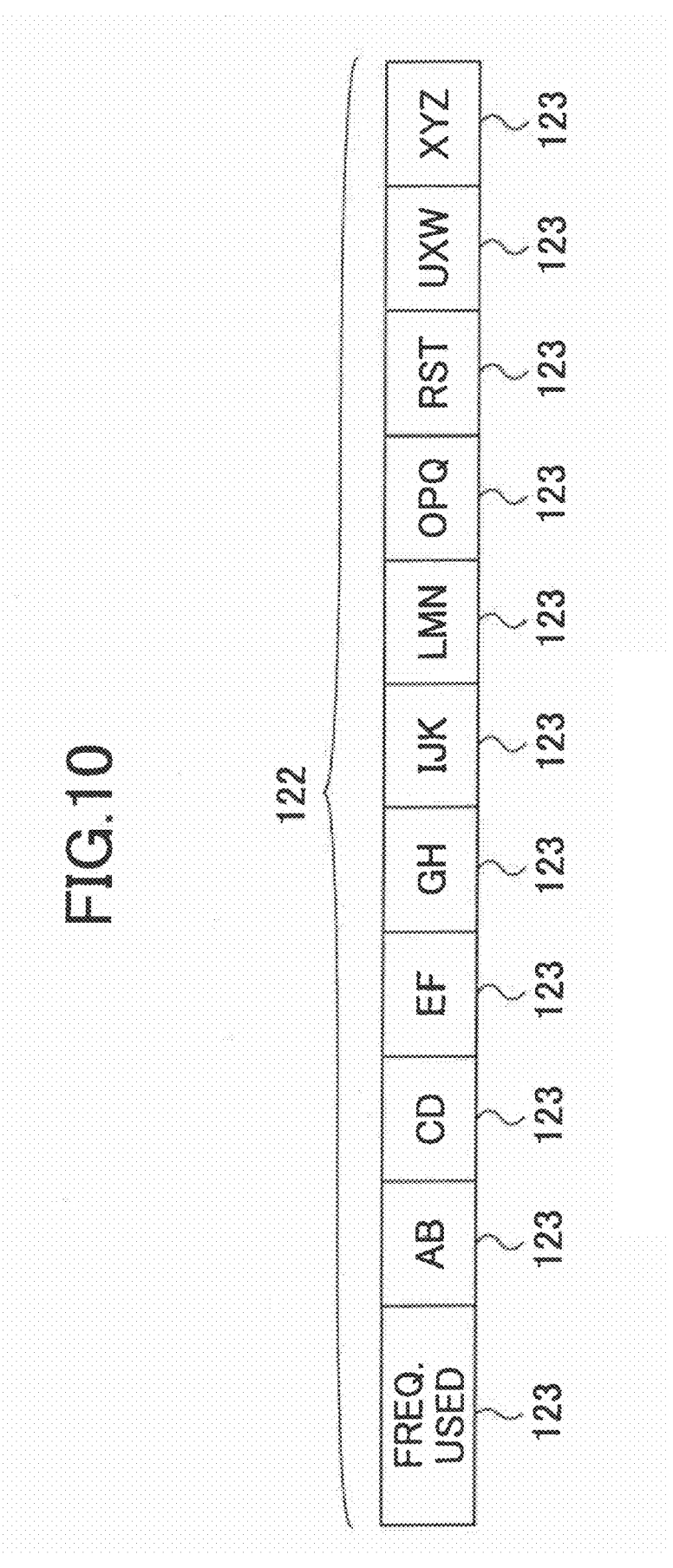

FIG. 10 illustrates a tag set and tags. A tag set 122 and tags 123 are additional information for better user interface. The tag set 122 is an ordered set of tags such as "Frequently Used", "ABC", and so forth, and contains the information of tags attached to the tag set. The tag 123 is a labeled ordered set of entries and contains the information of the label and entries attached thereto.

In addition, the "Frequently Used" tag 123 is a special tag that is attached to all tag sets. Tags 123 other than the "Frequently Used" are not attached to a plurality of tag sets. A more detailed description on this step will be given later.

Subsequent to the step S112, the scanner application 34 obtains the entries attached to a selected tag from the UCS 49 using the API (step S113).

Figure 11:
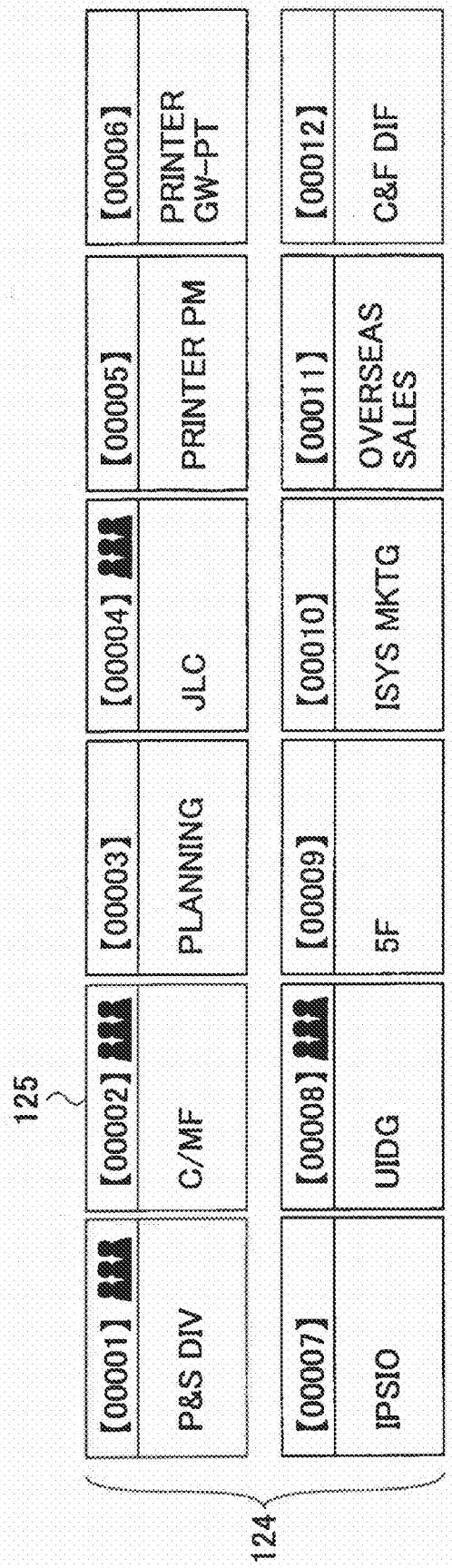
FIG. 11 is a schematic diagram showing tag entries according to an embodiment.

FIG. 11 is a schematic diagram illustrating entries. One or more entries 125 constituting the entries 124 are divided into accounts corresponding to individual users and groups corresponding to enumerated accounts. This step S113 will be described in more detail later.

Figure 12:
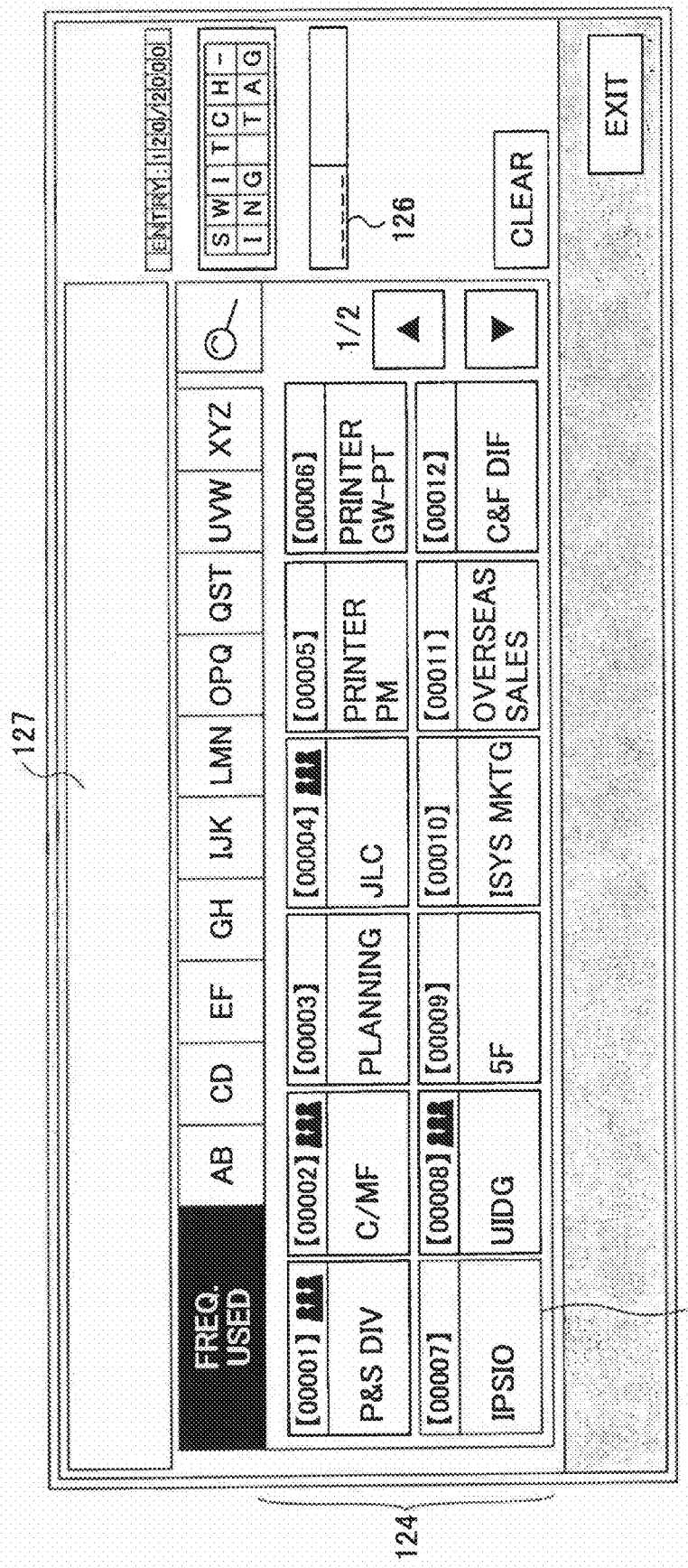
FIG. 12 is a schematic diagram showing an entry selection screen according to an embodiment.

Next after step S113, the scanner application 34 creates an entry selection screen as showed in FIG. 12 and displays the entry selection screen on the operation panel 70 (step S114). FIG. 12 is a schematic diagram illustrating the entry selection screen.

The entry selection screen of FIG. 12 is created based on the tag set, the tags, and the entries. An icon in which a small image of three people is showed at the upper right corner indicates a group of accounts. An icon without the small image of three people at the upper right corner indicates an individual account.

Next after step S114, the scanner application 34 determines whether an entry is selected from the entry selection screen (step S115). If the scanner application 34 determines that an entry is already selected (YES branch of S115), the scanner application 34 performs step S116. If the scanner application 34 determines that no entry is selected yet (NO branch of S115), the scanner application 34 performs step S117.

The scanner application 34 obtains the detailed information of the selected entry from the UCS 49 using the API (step S116), and then performs step S117. For example, the scanner application 34 may display the obtained detailed information of the selected entry in the information display field of the entry selection screen of FIG. 12.

The scanner application 34 determines whether another tag is selected from the entry selection screen (step S117). If the scanner application 34 determines that another tag is selected (YES branch of S117), the scanner application 34 returns to previous step S113. If the scanner application 34 determines that no tag is selected (NO branch of S117), the scanner application performs step S118.

The scanner application 34 determines whether it is informed by the UCS 49 of any update in the user information (step S118). If the scanner application 34 determines that it receives the update information (YES branch of S118), the scanner application 34 returns to previous step S112. If the scanner application 34 determines that it has not received the update information (NO branch of S118), the scanner application 34 returns to previous step S115.

Figure 13:
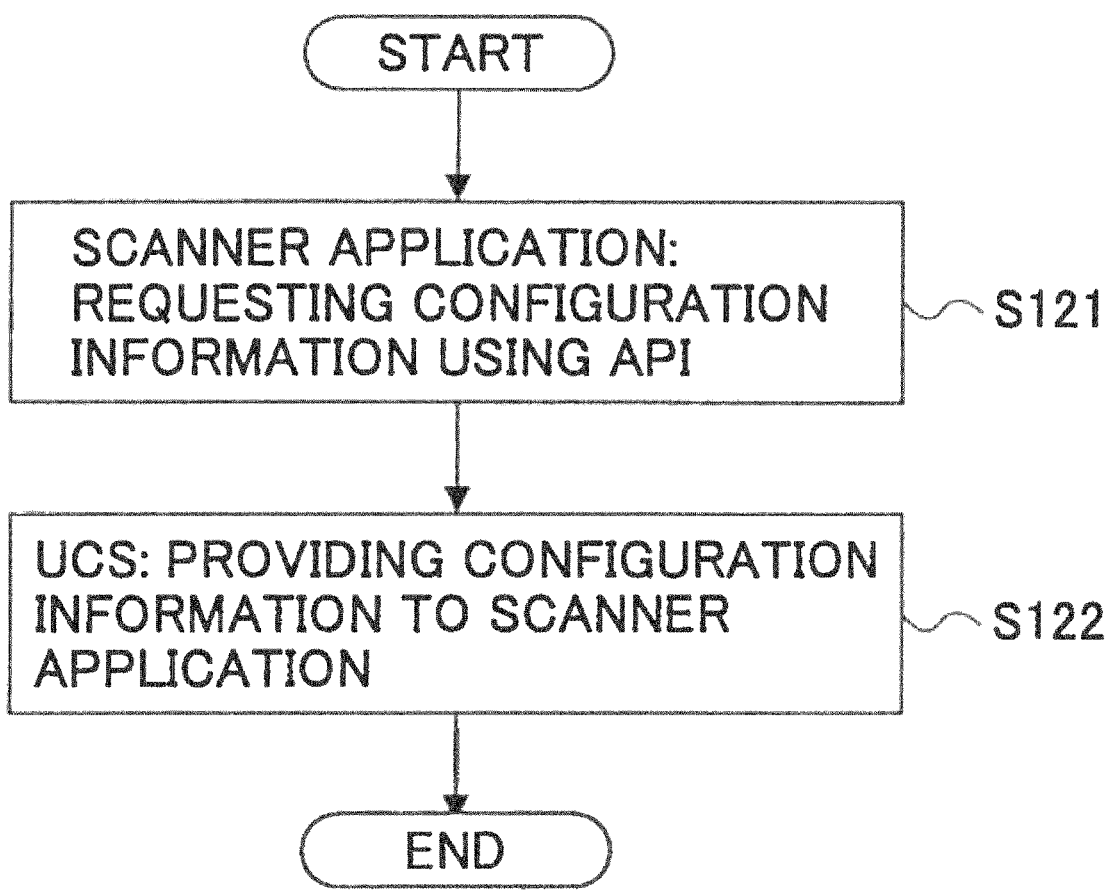
FIG. 13 is a flow chart showing the obtaining operation in step S110 of FIG. 9 according to an embodiment.

Furthermore, the steps of the flow chart showed in FIG. 9 will be described in more detail by reference to the drawings. FIG. 13 is a flow chart illustrating the step S110 of obtaining the configuration information. The scanner application 34 requests the UCS 49 to give the configuration information using the API for obtaining the configuration information (step S121). FIG. 14 illustrates the API for obtaining the configuration information.

After step S121, the UCS 49 provides the scanner application 34 with the configuration information (step S122). The UCS 49 creates the configuration information based on the incorporation information, the parameters, hardware configuration information, and charge information configuration obtained from the charge information controlling module 121. The charge information controlling module 121 sets up the charge information configuration based on the incorporation information, the parameters, and the hardware configuration information.

The configuration information of FIG. 15 contains a service version, usable functions, and the maximum number of entries to be registered. The service version is incorporation information of the UCS 49. The usable functions are determined by the UCS 49 based on the hardware configuration information, and indicates the existence of the charge information and the e-mail address information. The maximum number of entries to be registered is a control parameter of the UCS 49 indicating the maximum number of entries that the UCS 49 can register. An entry is the minimum unit containing the distribution address, the sender, a chargeable user and so forth and further contains a name and ID number.

Figure 16:
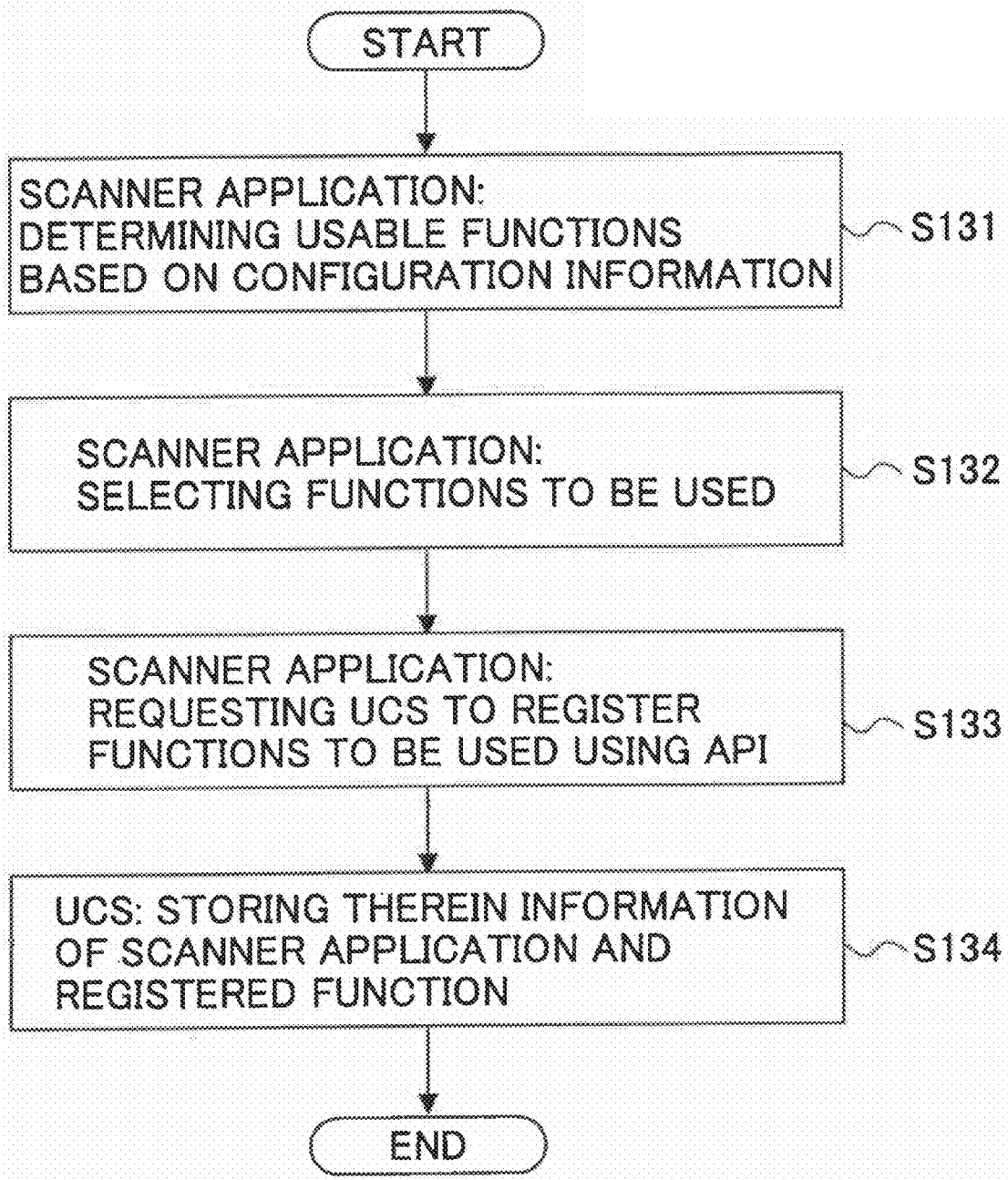
FIG. 16 is a flow chart showing the registering operation in step S111 of FIG. 9 according to an embodiment.

The step S111 for registering functions to be used will be described in more detail. FIG. 16 is a flow chart showing the step S111 for registering functions to be used. The scanner application 34 determines usable functions based on the configuration information obtained in step S122 (step S131).

Subsequent to step S131, the scanner application 34 selects functions to be used from the usable functions determined in step S131 (step S132). After step S132, the scanner application 34 request the UCS 49 to register the functions selected in step S132 using the API for registering functions to be used (step S133). FIG. 17 illustrates the API for registering functions to be used.

After step S133, the UCS 49 stores the corresponding relationship between the scanner application 34 that requests for the registration and the registered functions (step S134). After this step S134, when the user information is updated, the UCS 49 informs the scanner application 34 of the update.

Accordingly, since the scanner application 34 is informed of the update in the user information, the scanner application 34 can re-obtain the updated user information.

Figure 18:
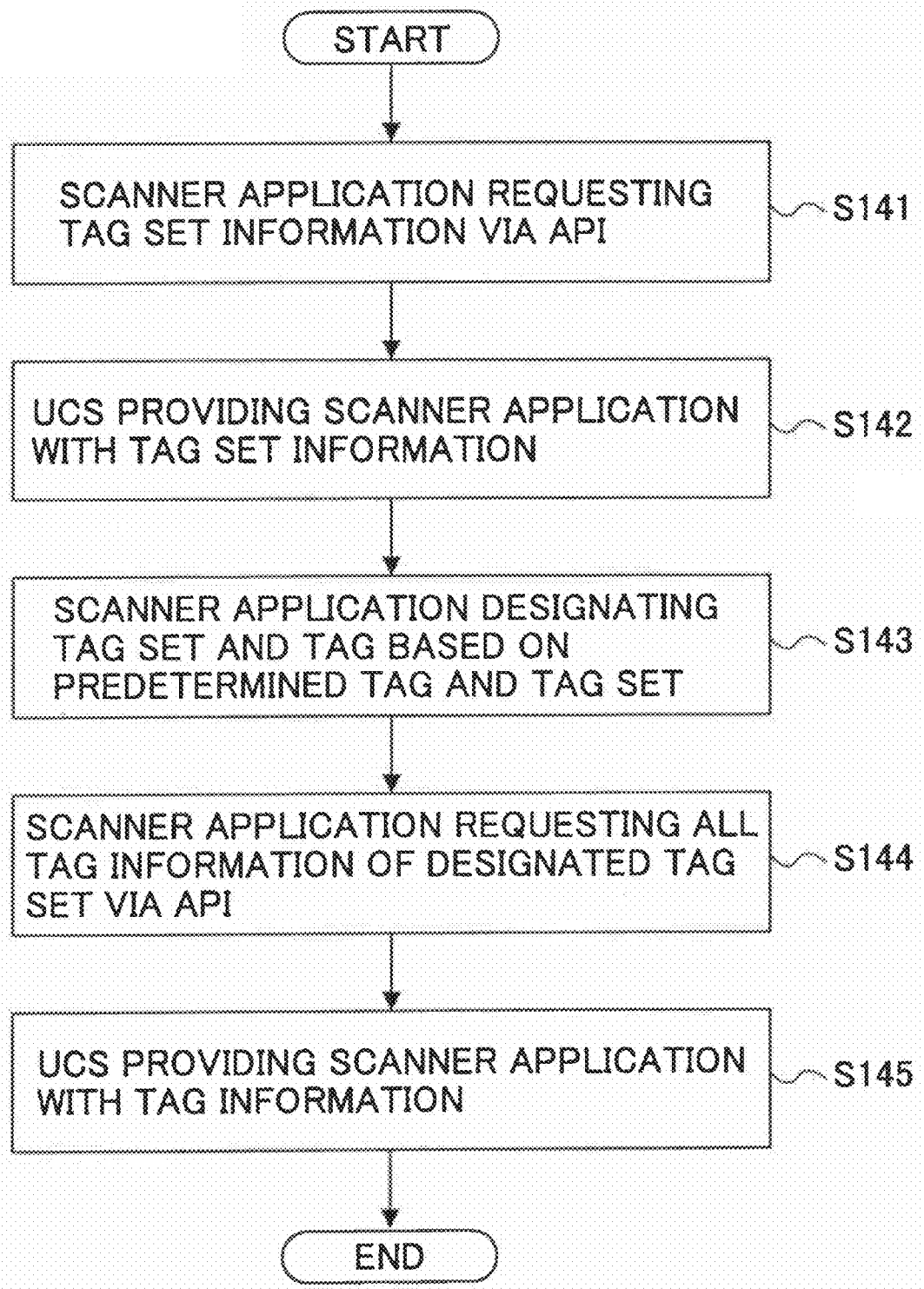
FIG. 18 is a flow chart showing the obtaining operation of tag set information and tag information in step S112 of FIG. 9 according to an embodiment.

A description about step S112 for obtaining a tag set and a tag will be given next. FIG. 18 is a flow chart illustrating step S112 for obtaining a tag set and a tag.

The scanner application 34 requests for all tag sets of the UCS 49 using the API for obtaining a tag set (step S41). FIG. 19 illustrates an API for obtaining a tag set.

Subsequent to step S141, the UCS 49 provides all tag sets to the scanner application 34 (step S142). FIG. 20 illustrates a tag set. The tag set of FIG. 20 contains data items such as an ID number, the number of tags attached to the tag set, and attached tags. The ID numbers of tags attached to the tag set are stored in the attached tags field.

After step S142, the scanner application 34 selects tag sets and tags based on the reference value of the tag sets and the tags that the scanner application 34 contains as the control parameters (step S143).

Subsequent to step S143, the scanner application 34 requests for all tags attached to the tag sets selected in step S143, from the UCS 49 using an API for obtaining tags (step S144). FIG. 21 illustrates the API for obtaining tags.

Subsequent to step S144, the UCS 49 reads tags from the HDD 66 and provides the tags to the scanner application 34. FIG. 22 illustrates tag information. The tag information of FIG. 22 contains data items such as a tag ID number, a tag category, and a label. The tag category is used to identify whether the tag is "frequently used" or not.

The next step S113 for obtaining tag entries will be described below. FIG. 23 is a flow chart showing step S113 for obtaining tag entries.

The scanner application 34 requests the tag entries attached to the tag selected in step S143 from the UCS 49 using an API for obtaining tag entries (step S151). FIG. 24 illustrates the API for obtaining tag entries.

After step S151, the UCS 49 reads the tag entries from the HDD 66 and provides the read tag entries to the scanner application 34 (step S152). FIG. 25 illustrates the tag entries. The tag entries of FIG. 25 contain data items such as an entry ID number, an entry index number, an entry category, and a user name. The entry index number is attached so that users can easily memorize it. The entry category indicates whether a user is authorized to become an addressee of distribution, whether the user is authorized to become a sender, and whether the entry is an account or a group of accounts.

It is not necessary to obtain all the tag entries attached to the tag at once. Only tag entries that fit a screen of the operation panel 70 may be obtained at first. The tag entries may be filtered by designating filtering conditions so that only entries having e-mail addresses or being authorized to become senders, for example, are displayed.

Figure 26:
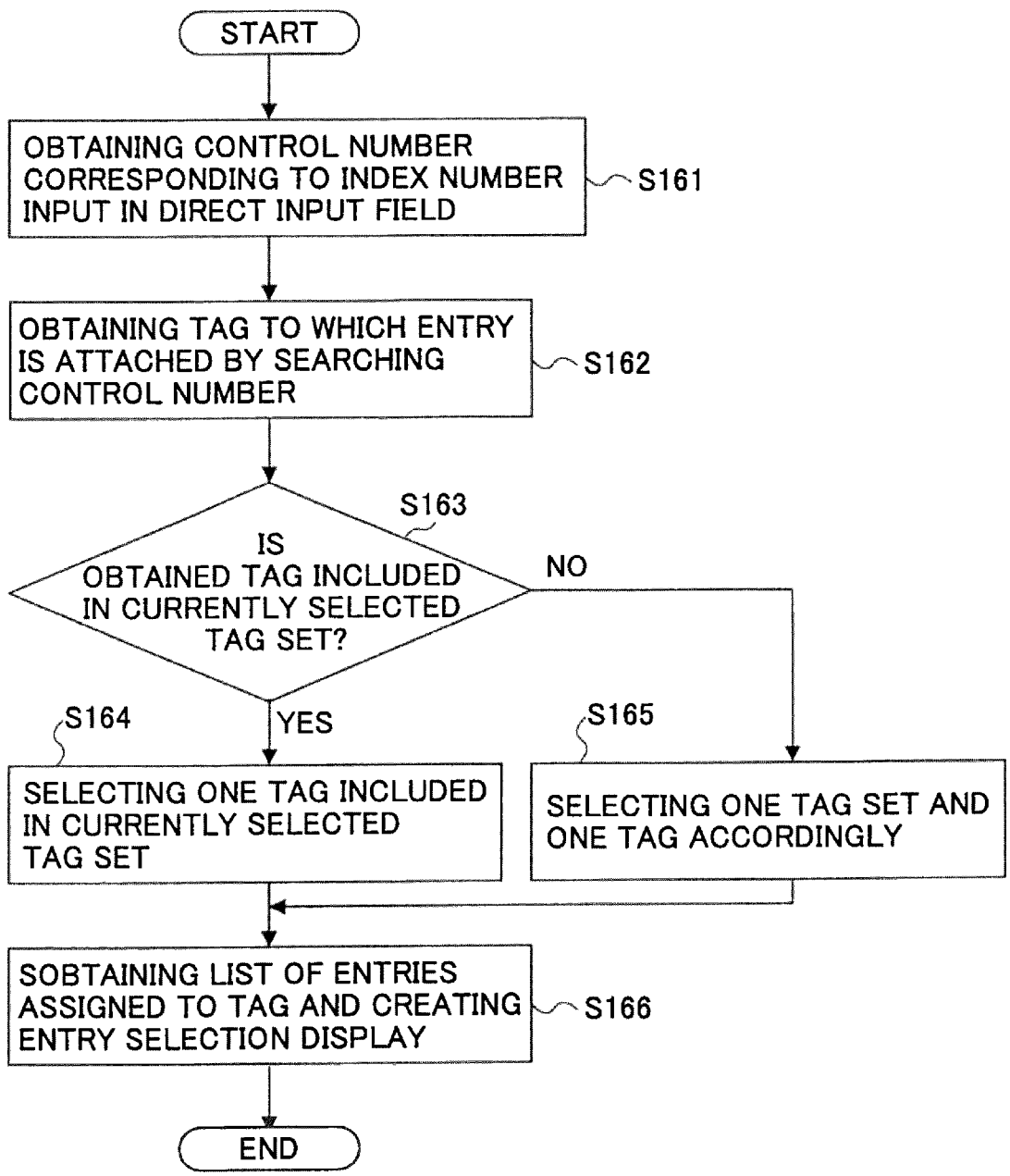
FIG. 26 is a flow chart showing an inputting operation of an entry index number according to an embodiment.

The case in which an entry index number is input to a direct input field 126 in the entry selection screen of FIG. 12 will be described. FIG. 26 is a flow chart showing a step for processing an input of an entry index number.

Using an API for obtaining an entry control number corresponding to an entry index number, the scanner application 34 obtains from the UCS 49 an entry control number corresponding to the entry index number input in the direct input field 126 (step S161). FIG. 27 illustrates the API for obtaining an entry control number corresponding to an entry index number.

Subsequent to step S161, the scanner application 34, using an API for obtaining a tag to which an entry is attached based on the entry control number of the entry, obtains from the UCS 49 the tags to which the entry is attached based on the entry control number obtained in step S161 (step S162). FIG. 28 illustrates the API for obtaining tags to which an entry is attached from its entry control number.

Then, the scanner application 34 determines whether the tags obtained in step S162 is included in the currently selected tag set (step S163).

If the tags obtained in step S162 are included in the currently selected tag set (YES branch of S163), the scanner application 34 selects one tag included in the currently selected tag set out of the tags obtained in step S162 (step S164). If more than one tags obtained in step S162 are included in the currently selected tag set, one of the tags needs to be selected in compliance with appropriate criteria such as the order of their tag control numbers, for example.

On the other hand, if none of the tags obtained in step S162 is included in the currently selected tag set (NO branch of S163), the scanner application 34 select one tag set and one tag in compliance with appropriate criteria (step S165).

After step S164 or step S165, the scanner application 34 obtains from the UCS 49 tag entries attached to the tag selected in step S164 or step S165 using the API for obtaining tag entries (step S166). Then, the scanner application 34 creates, using the obtained tag entries, the entry selection screen as showed in FIG. 12 and displays it on the operation panel 70.

If the order of tag entries is known, the step S166 may be easy. In the case where 12 tag entries can be displayed in one screen of the operation panel 70 and the order of a desired entry is the $20^{th}$, for example, only 12 entries starting with the $13^{th}$ entry may be obtained.

Using an API for obtaining the order of entries, the scanner application 34 obtains the order of entries attached to a tag from the UCS 49. FIG. 29 illustrates the API for obtaining the order of entries.

Thanks to this API for obtaining the order of entries, it is not necessary to repeat a step for obtaining 12 entries and determining whether the desired entry is included in the obtained entries.

The UCS 49 provides an API for obtaining mail information as well. FIG. 30 illustrates the API for obtaining the e-mail information. The scanner application 34 can obtain the mail information such as e-mail addresses from the UCS 49 using the API for obtaining mail information.

FIG. 31 illustrates an API for obtaining sender authentication information. The scanner application 34 obtains the sender authentication information from the UCS 49 using the API for obtaining the sender authentication information. The sender authentication information is a password, for example, that is used to identify the sender.

FIG. 32 illustrates an API for obtaining user restriction information. The scanner application 34 obtains the user restriction information using the UCS 49. The user restriction information is a series of flags indicating specific restrictions such that the user is prohibited from using the color LP, or that the user is prohibited from using the black & white LP, for example.

FIG. 33 illustrates an API for obtaining e-mail group information. The scanner application 34 obtains e-mail group information from the UCS 49 using the API for obtaining e-mail group information. The e-mail group information is information such as the number of accounts attached to an e-mail group and the accounts themselves attached to the e-mail group.

FIG. 34 illustrates an API for searching entries. The scanner application 34 causes the UCS 49 to search entries using this API for searching entries. Various search conditions such as forward match, backward match, and partial match.

In the above description by reference to FIG. 8, the facsimile application 33 creates the screen to be displayed on the operation panel 70. Another separate module for creating a screen to be displayed on the operation panel 70 may be provided.

Figure 35:
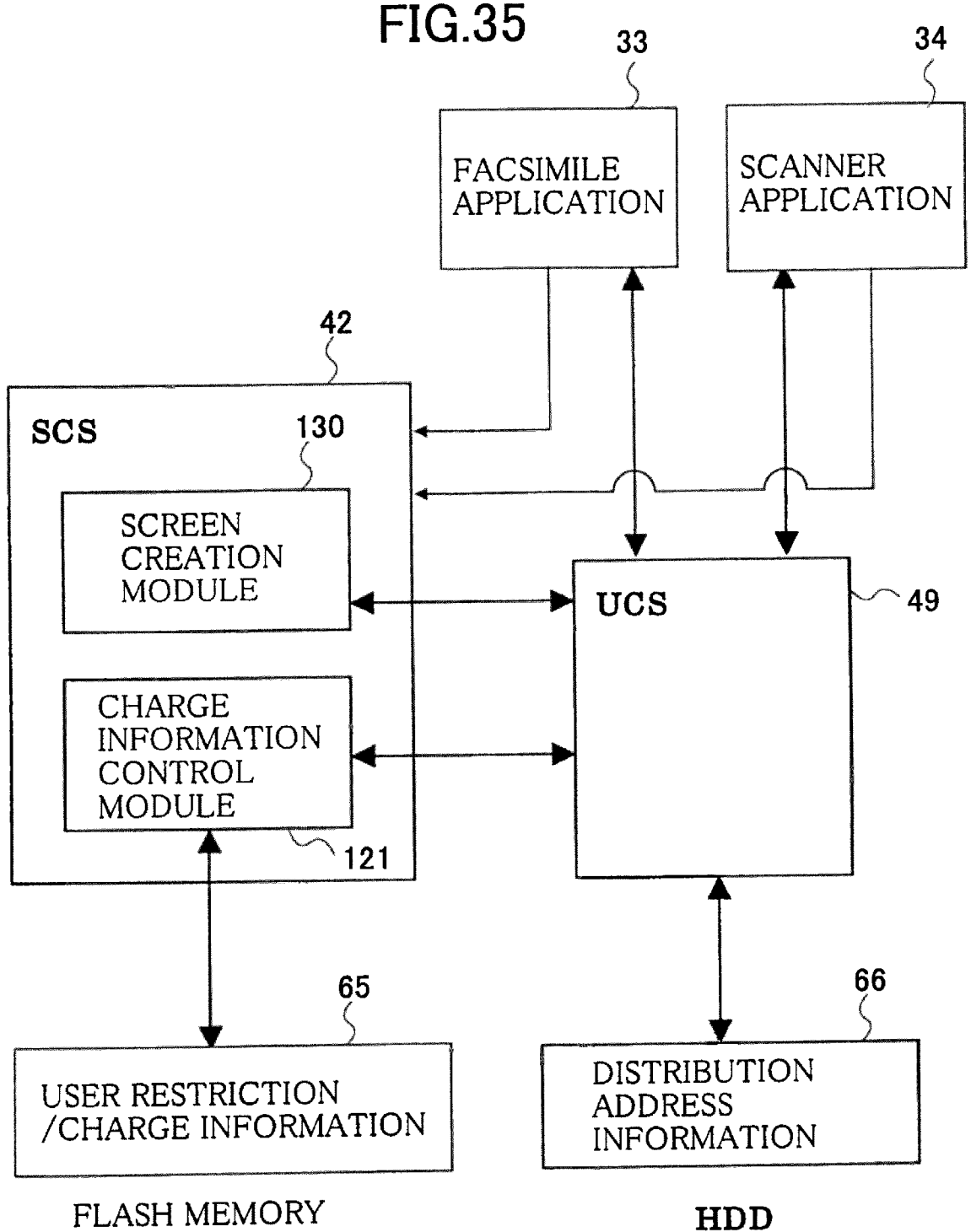
FIG. 35 is a schematic diagram for explaining the operation of a screen creating module according to an embodiment.

FIG. 35 is a schematic diagram showing the operation of a module for creating a screen. The screen creating module 130 included in the SCS 42 creates a screen to be displayed on the operation panel 70 in response to a request from the facsimile application 33 and the scanner application 34.

As described above, the facsimile application 33 and the scanner application 34 can share the screen creating module 130 that is provided separately.

Since the multifunctional apparatus 1 is provided with the UCS 49, a plurality of applications programs such as the facsimile application 33 and the scanner application 34 can share the user information. Whichever, the flash memory 65 or the HDD 66, the user information is stored in, the application programs can obtain the user information by accessing only the UCS 49.

In FIG. 1, the UCS 49 is included in the control service, but the UCS 49 may be included in the application program 30, for example. In addition, in FIG. 8, the facsimile application 33 and the scanner application 34 access the user information through the API provided by the UCS 49, but the control service may access the user information through the API provided by the UCS 49, for example.

Though the multifunctional apparatus 1 is mainly described in this embodiment, those skilled in the art may easily recognize that the present invention is also applicable to the information processing apparatus 1000 showed in FIGS. 1 and 2. In the case of the information processing apparatus 1000, the user information processing unit 1260, instead of the UCS 49 of FIGS. 5 and 8, controls the user information. In this case, no unit corresponding to the SCS 42 is required.

Second Embodiment

A detailed description of the information processing apparatus according to the second embodiment of the present invention will be given below. The hardware configuration of the information processing apparatus is identical to that of the information processing apparatus according to the first embodiment. The software configuration thereof is also substantially identical to the first embodiment. Accordingly, only what is different will be mainly described.

The updating of the user information by the system initialization module 122 included in the SCS 42 using the UCS 49 will be described below.

Figure 36:
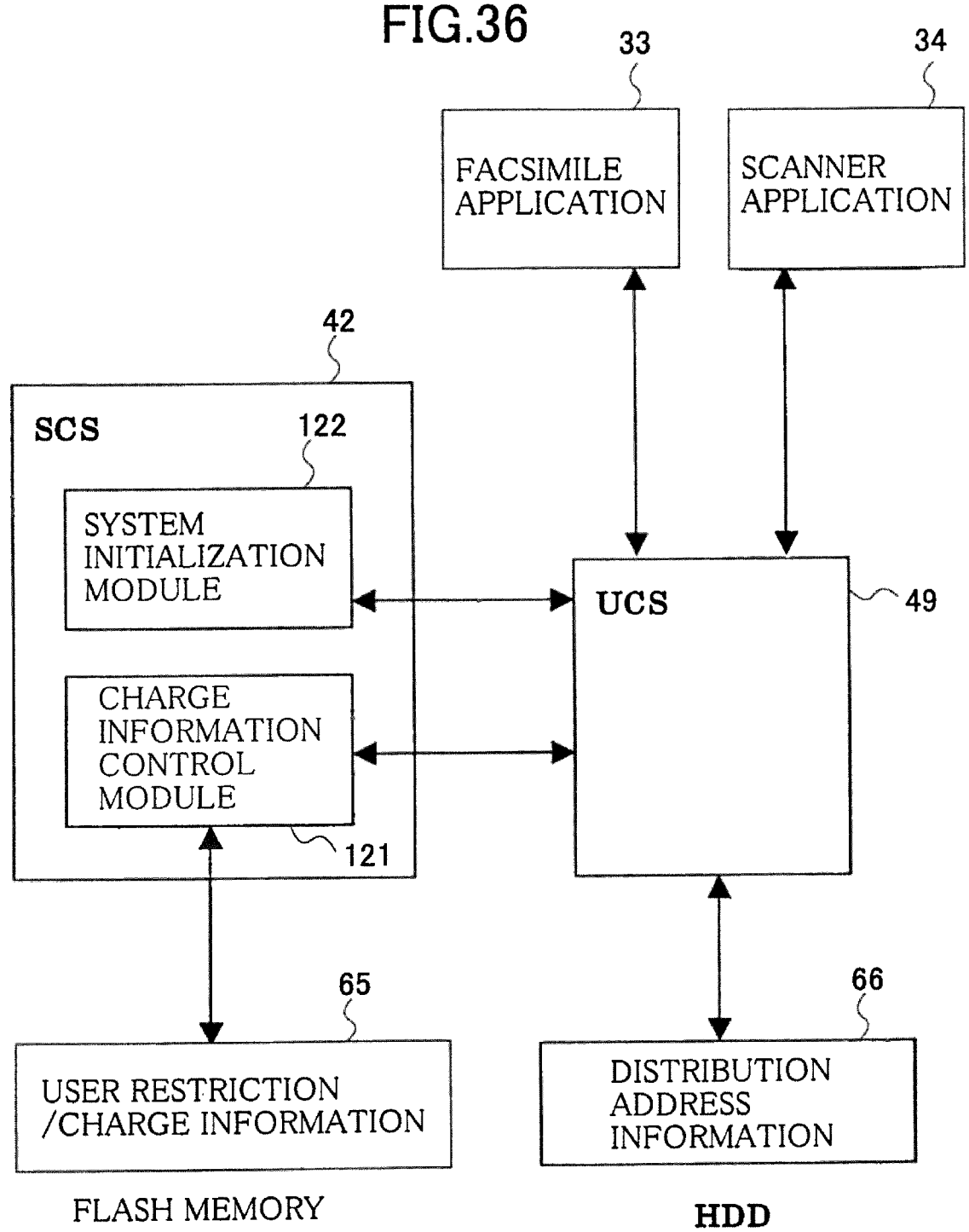
FIG. 36 is a schematic diagram for explaining an updating operation of the user information according to an embodiment.

FIG. 36 is a schematic diagram for explaining the updating operation of the user information. The system initializing module 122 as a client requests the UCS 49 to update the user information.

The UCS 49 determines which, the flash memory 65 or the HDD 66, the user information requested by the system initialization module 122 is stored in. The UCS 49 updates the user information stored in the flash memory 65 or the HDD 66 in response to the request from the system initialization module 122 for updating.

In particular, the UCS 49 updates the distribution address information stored in the HDD 66 in response to the request from the system initialization module 122 for updating the distribution address information. The UCS 49 also updates the user restriction/charge information stored in the flash memory 65 in response to the request from the system initialization module 122 for updating the user restriction/charge information. The UCS 49 updates the user restriction/charge information stored in the flash memory 65 via the charge information controlling module 121.

Accordingly, the system initialization module 122 can update the user information without designating where the user information desired to be updated is stored. The system initialization module 122 initiates the use of the UCS 49 as follows.

The UCS 49 as a server creates a thread for waiting for a request, opens a socket, and waits for the request. The system initialization module 122 creates a thread to wait for an event, opens a socket, and waits for the event. At the same time, the UCS 49 registers a subscription through the socket.

The inter-process communication between the request from the system initialization module 122 and the event from the UCS 49 through the socket of UCS 49 and the socket of the system initialization module 122, respectively, enables the system initialization module 122 and the UCS 49 to collaborate.

Figure 37:
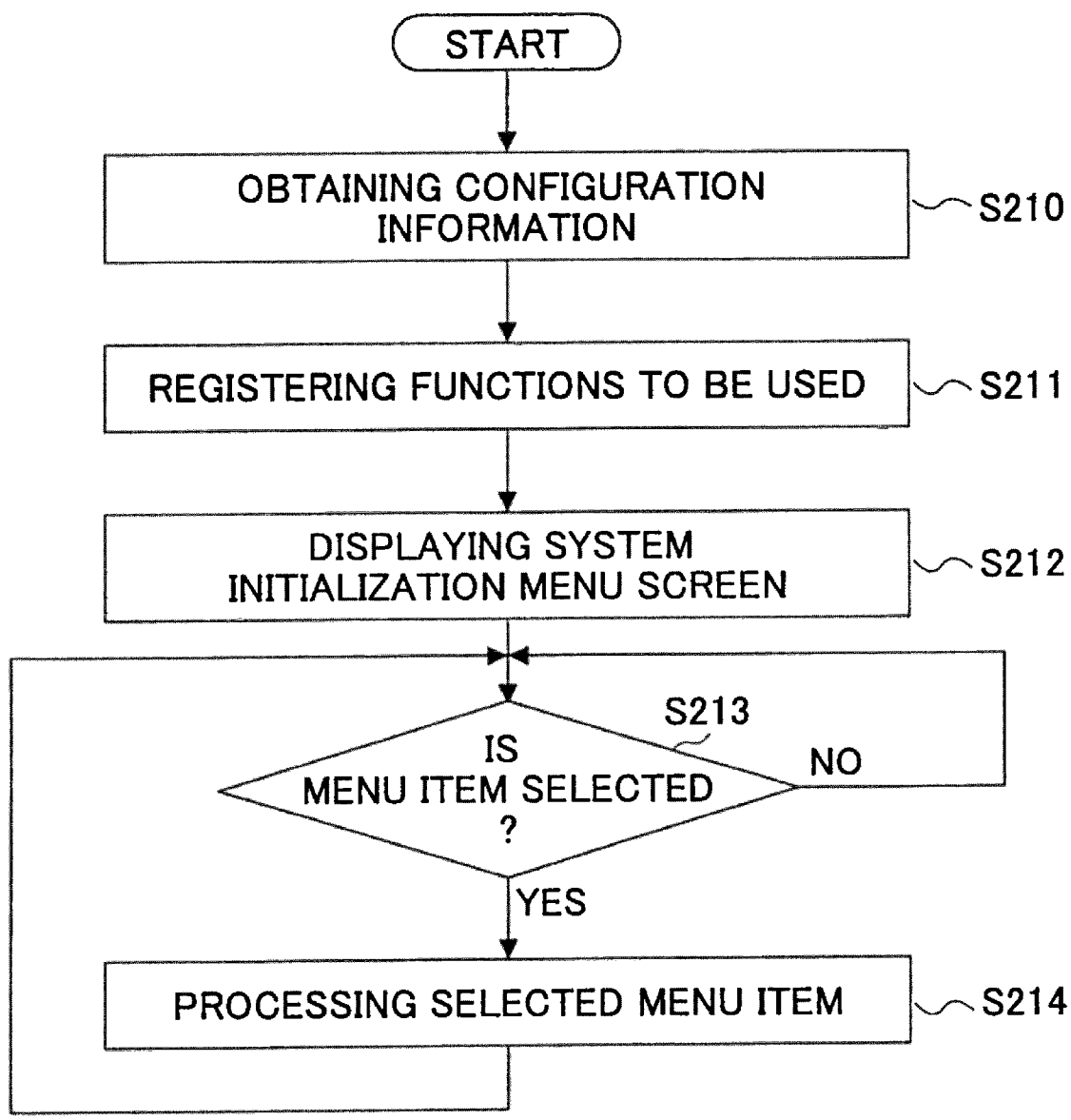
FIG. 37 is a flow chart showing an updating operation of distribution address information according to an embodiment.

Next, the operation of the system initialization module 122 to update the user information will be described by reference to another drawing. FIG. 37 is a flow chart showing the updating operation of the distribution address information.

The system initialization module 122 obtains the configuration information of the UCS 49 using an API (step S210). The configuration information is information about the configuration of the UCS 49, and includes the incorporation information and the setup parameter information of the UCS 49 and the charge information controlling module 121.

Next to step S210, the system initialization module 122 determines usable functions based on the obtained configuration information and registers the functions to be used in the UCS 49 using an API (step S211).

Figure 38:
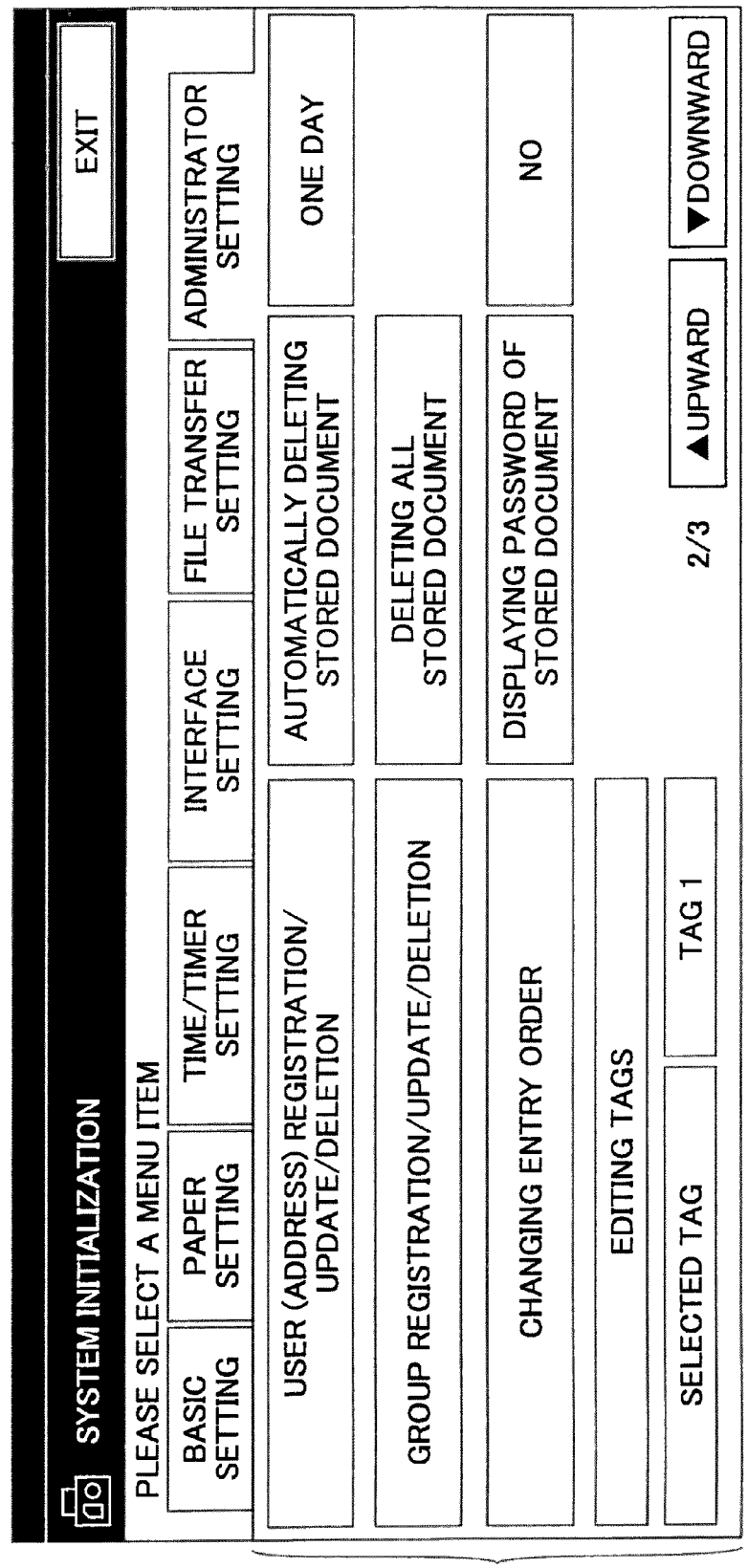
FIG. 38 is a schematic diagram showing a system initialization menu screen according to an embodiment.

Subsequent to step S211, the system initialization module 122 creates a menu screen for system initialization and displays the menu screen on the operation panel 70 (step S212). FIG. 38 is a schematic diagram of the menu screen for the system initialization.

The menu screen for system initialization of FIG. 38 includes one or more menu buttons 2130 corresponding to processing to update the user information. A user can select a desired operation by pressing a menu button 2130 displayed in the menu screen for system initialization on the operation panel 70.

After step S212, the system initialization module 122 determines whether a menu item has been selected (step S213). If the system initialization module 122 determines that a menu item has been selected from the system initialization menu screen (YES branch of S213), the system initialization module 122 processes the selected menu item (step S214). A detailed description on step S214 will be given later.

On the other hand, if the system initialization module 122 determines that no menu item has been selected from the system initialization menu yet (NO branch of S213), the system initialization module 122 repeats step S213.

Step S214 will be described in detail by reference to the drawings below. If an item "USER (ADDRESS) REGIS- TRATION/UPDATE/DELETION" is selected from the system initialization menu, the system initialization module 122 displays an entry information updating screen as showed in FIG. 39 on the operation panel 70. The system initialization module 122 obtains information that is needed to create the entry information updating screen such as tag set information, tag information, and tag entries attached to a tag from the UCS 49 using an API.

Figure 39:
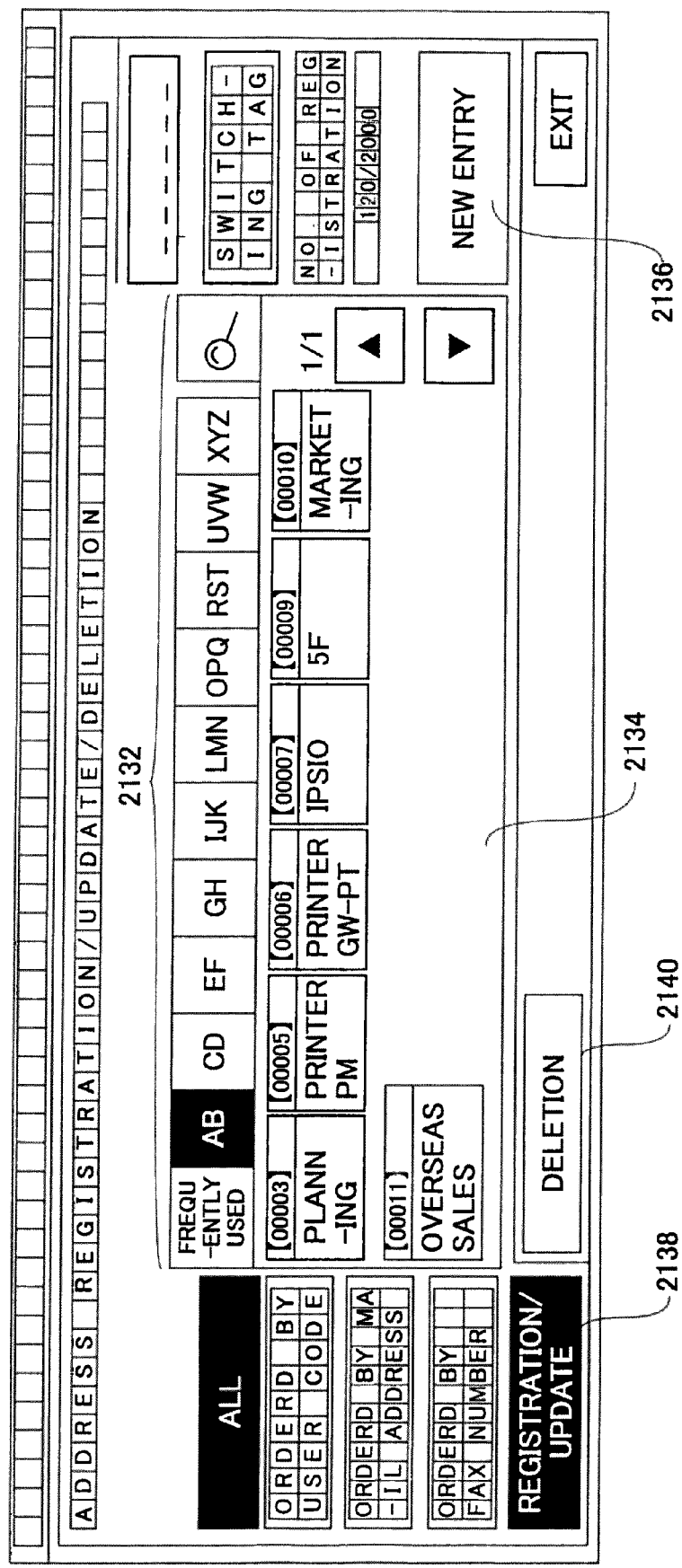
FIG. 39 is a schematic diagram showing an entry information update screen according to an embodiment.

FIG. 39 is a schematic diagram of the entry information updating screen. An entry means a user (address) and is divided into an account corresponding to an individual user and a group of accounts.

The entry information update screen of FIG. 39 includes a tag set 2132 including one or more tags, an entry display field 2134 displaying tag entries attached to the selected tag, a new item button 2136 with which the user can open a new screen to create and register new entry information, an update button 2138 for updating an entry information that is already registered, and a deletion button 2140 for deleting a selected entry information.

The tag set 2132 is an ordered set of tags such as "FREQUENTLY USED" and "AB". The tag is a labeled ordered set of entries. In the entry information updating screen of FIG. 39, a tag "AB" is selected, and 7 entries attached to the tag "AB" are displayed in an entry display field 2134.

Figure 40:
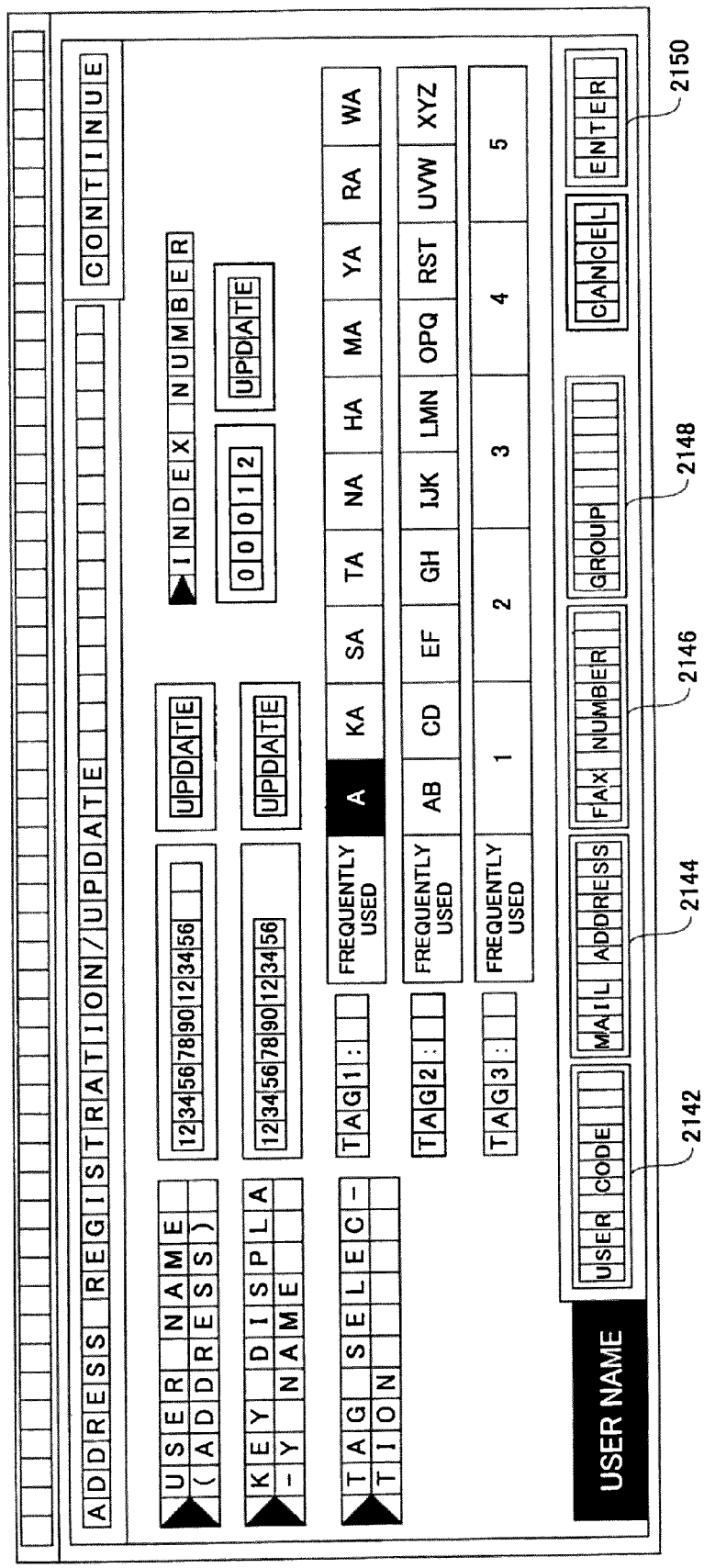
FIG. 40 is a schematic diagram showing an entry information registration screen according to an embodiment.

If the new entry button 2136 is selected, the system initialization module 122 displays an entry information registration screen as showed in FIG. 40 on the operation panel 70 so that the user can create a new entry and register it. FIG. 40 is a schematic diagram showing the entry information registration screen.

The entry information registration screen of FIG. 40 includes a field to input user name (address), a field to input the index number, tag buttons to set a tag to which the entry is attached, a user code button 2142 to enter a screen for inputting a user code, a mail address button 2144 to enter a screen for inputting a mail address, a facsimile number button 2146 to enter a screen for inputting a facsimile number, a group button 2148 to enter a screen for setting a group, and a registration button 2150 to register the entry information.

A user sets a user (address) name, an index number, and a tag to which the user is attached in the entry information registration screen. The user inputs the user code in the displayed screen for setting the user code by selecting the user code button 2142. The user code is information indicating the restrictions on functions that the user can use.

The user can input the mail address by selecting the mail address button 2144 and displaying a screen for setting the mail address on the operation panel 70. The user further can input the facsimile address by selecting the facsimile number button 2146 and displaying a screen for inputting the facsimile number on the operation panel 70. Furthermore, the user can select a group to which the entry is to be attached by selecting the group button 2148 and displaying a screen for setting a group on the operation panel 70.

After setting all information that is required for an entry, the user selects the registration (enter) button 2150 of the entry information registration screen of FIG. 40. The system initialization module 122 requests the UCS 49 to update the entry information using various APIs.

The system initialization module 122 requests the UCS 49 to create the entry using an API showed in FIG. 41. FIG. 41 illustrates an API for creating an entry. The UCS 49 creates an entry in response to this API. When a new entry is created, the new entry is displayed in the entry display field 2134 of the entry information updating screen, for example.

The system initialization module 122 also requests the UCS 49 to set an entry tag to which the entry is to be attached using an API as showed in FIG. 42. FIG. 42 illustrates the API for setting entry tag to which an entry is to be attached. The UCS 49 sets the entry tag in response to the API for setting the entry tag to which the entry is to be attached.

Using an API showed in FIG. 43, the system initialization module 122 request the UCS 49 to set a usercode. FIG. 43 illustrates an API for setting the usercode. The UCS 49 sets the usercode in compliance with the API.

Using an API as showed in FIG. 44, the system initialization module 122 requests the UCS 49 to set a mail address. FIG. 16 illustrates the API for setting the mail address. The UCS 49 sets the mail address in compliance with the API for setting the mail address.

Using an API, the system initialization module 122 requests the UCS 49 to set a facsimile number (destination). The UCS 49 sets the facsimile number (destination) in compliance with the API.

The system initialization module 122, using an API as showed in FIG. 45, determines whether the index number set in the entry information registration screen is already registered. If the index number is already registered, the system initialization module 122 requests the UCS 49 to obtain an unused index number close to the already registered index number.

FIG. 45 illustrates an API for obtaining an index number. Using an API for checking index number, the UCS 49 determines whether the index number set in the entry information registration screen is already registered. If the index number is already registered, the UCS 49 obtains an unused index number near the already registered index number.

When the update button 2138 in the entry information updating screen of FIG. 39 is selected, the system initialization module 122 displays the entry information registration screen for updating already registered entry information as showed in FIG. 40 on the operation panel 70. The entry information registration screen showed when the update button 2138 is selected is different from the entry information registration screen showed when the new entry button 2136 is selected in that already registered entry information is displayed.

Using various APIs, the system initialization module 122 displays already registered entry information in the entry information registration screen. The system initialization module 122 obtains a group to which an entry is attached from the UCS 49 using an API showed in FIG. 46. FIG. 46 illustrates an API for obtaining a group to which an entry is attached.

The description of the registration of information in the entry information registration screen will be omitted since the registration of information in the entry information registration screen displayed when the update button 2138 is selected is the same as that in the entry information registration screen displayed when the new entry button 2136 is selected.

After inputting all information needed to update the entry information, the user selects the enter button 2150. In response to the selection, the system initialization module 122 requests the UCS 49 to update the entry information using various APIs.

For example, the system initialization module 122 uses an API as showed in FIG. 47 to request the UCS 49 to update the entry. FIG. 47 illustrates the API for updating the entry. The UCS 49 updates the entry in compliance with the API.

On the other hand, when an entry in the entry display field 2134 of the entry information updating screen of FIG. 39 is selected and then, the delete button 2140 is selected, the system initialization module 122 deletes the entry using an API of FIG. 48. FIG. 48 illustrates the API for deleting an entry.

When the "editing tags" is selected in the system initialization menu of FIG. 38, the system operates as follows. When the "editing tags" is selected, the system initialization module 122 displays a tag editing screen on the operation panel 70. The tag editing screen includes the tag sets 2132 identical to that of the entry information updating screen of FIG. 39. Using an API, the system initialization module 122 obtains tag set information and tag information that are needed to create the tag editing screen from the UCS 49.

After inputting all information required to update tags, the user selects the enter button of the tag editing screen, for example. In response to the selection, the system initialization module 122 requests the UCS 49 to update the tags using an API as showed in FIG. 49. FIG. 49 illustrates an API for updating the tags. The UCS 49 updates the tags in compliance with the API.

When "changing entry order" is selected in the system initialization menu screen, the system operates as follows. When "changing entry order" is selected, the system initialization module 122 displays an entry order change screen on the operation panel 70. The entry order change screen includes, as the entry information updating screen does, a tag set 2132 and an entry display field 2134 in which entries attached to the selected tag are displayed. The system initialization module 122 obtains the tag set information and tag information that are required for creating the entry order change screen from the UCS 49 using an API.

The user changes the order of entries displayed in the entry display field 2134, for example, as desired and selects the enter button of the entry order change screen, for example. The system initialization module 122 requests the UCS 49 to change the order of entries using an API as showed in FIG. 50. FIG. 50 illustrates an API for changing the order of entries. The UCS 49 changes the order of entries in compliance with the API.

The UCS 49 can support the following API. FIG. 51 illustrates an API for setting sender authentication. The system initialization module 122 requests the UCS 49 to set the sender authentication information using the API for setting sender authentication. The sender authentication information is a password, for example, that can be used to identify a sender.

FIG. 52 illustrates an API for setting a mail group. The system initialization module 122 requests the UCS 49 to set a mail group using the API for setting a mail group. The mail group means information such as the number of accounts and the accounts attached to the mail group.

FIG. 53 illustrates the API for obtaining the number of entries registered. The system initialization module 122 can obtain the number of registered entries from the UCS 49 using the API for obtaining the number of entries registered.

FIG. 54 illustrates an API for obtaining the number of accounts registered. The system initialization module 122 can obtain the number of registered entries from the UCS 49 using the API for obtaining the number of registered accounts.

FIG. 55 illustrates an API for obtaining the number of registered groups. The system initialization module 122 can obtain the number of registered groups from the UCS 49 using the API for obtaining the number of registered groups.

FIG. 56 illustrates an API for obtaining the number of registered mail addresses. The system initialization module 122 can obtain the number of registered mail addresses from the UCS 49 using the API for obtaining the number of registered mail addresses.

FIG. 57 illustrates an API for obtaining the number of registered usercodes. The system initialization module 122 can obtain the number of registered usercodes from the UCS 49 using the API for obtaining the number of registered usercodes.

The numbers of entries, accounts, groups, mail addresses, and usercodes are used to create a screen to update the information of the entries, the accounts, the groups, the mail addresses, and the usercodes, for example.

As described above, since the UCS 49 that controls the user information is provided, the system initialization module 122 can update the user information without designation of where the user information is stored.

In FIG. 3, the UCS 49 is included in the control service, but the UCS 49 may be included in the application program 30, for example. In addition, in FIG. 36 and so forth, the system initialization module 122 requests the UCS 49 to update the user information using the API provided by the UCS 49, but the present invention is not limited to this example. The application programs 30 such as the facsimile application 33 may request the UCS 49 to update the user information using the API provided by the UCS 49, for example.

Though the multifunctional apparatus 1 is mainly described in this embodiment, those skilled in the art may easily recognize that the present invention is also applicable to the information processing apparatus 1000 showed in FIGS. 1 and 2. In the case of the information processing apparatus 1000, the user information processing unit 1260, instead of the UCS 49 of FIGS. 5 and 8, controls the user information. In this case, no unit corresponding to the SCS 42 is required.

Third Embodiment

The method of controlling the user information according to the third embodiment of the will be described below. The multifunctional apparatus 1 will be mainly described as an example of the information processing apparatus 1000 according to the present invention.

Figure 58:
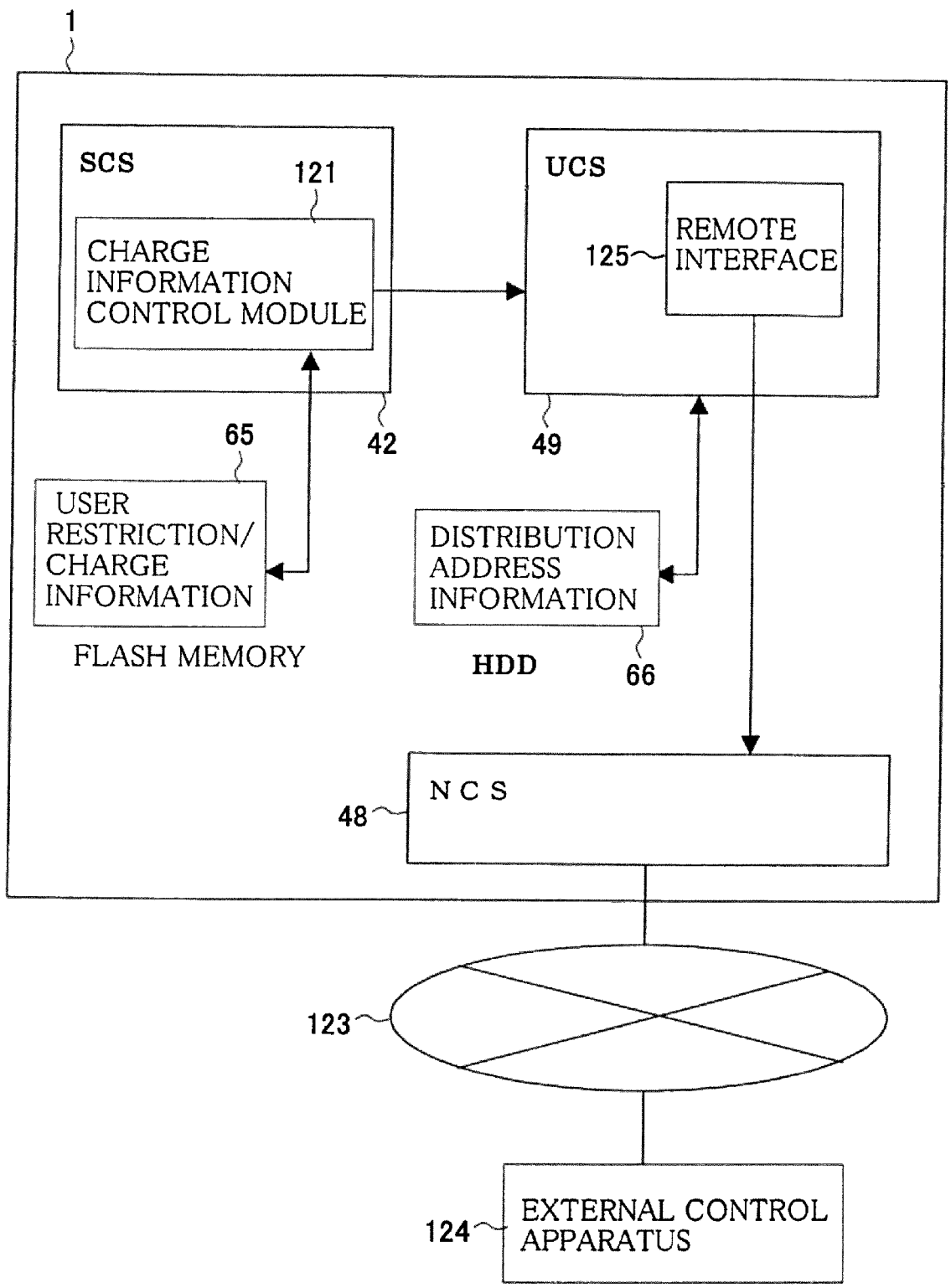
FIG. 58 is a schematic diagram for explaining a method of controlling the user information according to an embodiment of the present invention.

FIG. 58 is a schematic diagram for explaining the method of controlling the user information according to this embodiment. FIG. 58 shows the configuration of the multifunctional apparatus 1 according to this embodiment. The components that are identical to those showed in FIG. 5 are referred to by the same reference numerals, and their description is omitted.

A remote interface 125 in the UCS 49 and an external control apparatus 124 communicates through the NCS 48 and the network 123 using the simple object access protocol (SOAP) for exchanging messages expressed in the extensible markup language (XML).

The remote interface 125 has one or more web service functions (WSF) for realizing web services. The external control apparatus 124 remotely controls the user information by remotely accessing the WSF externally provided by the remote interface 125 using SOAP.

Figure 59:
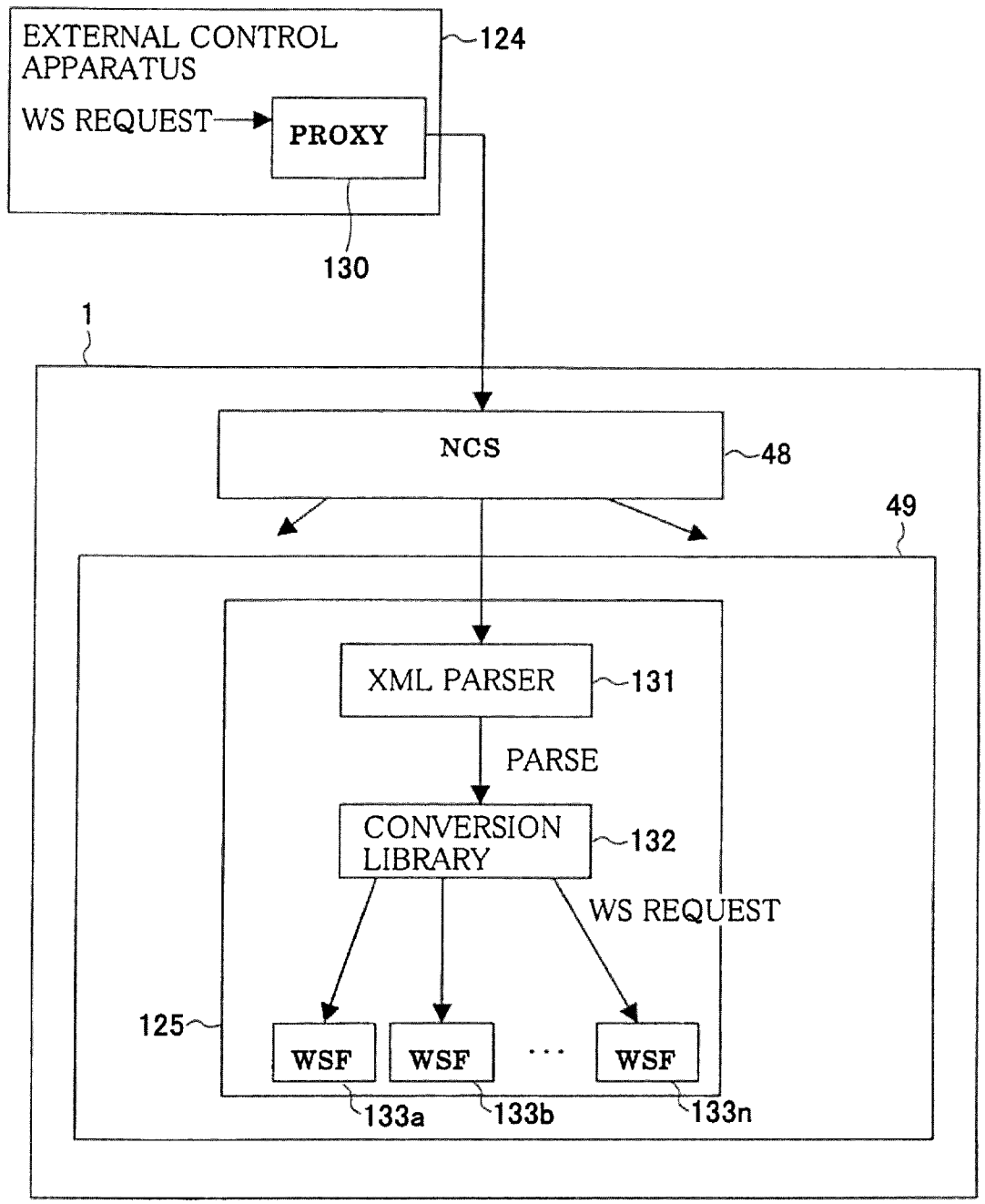
FIG. 59 is a schematic diagram for explaining the remote control of the user information according to an embodiment.

FIG. 59 is a schematic diagram for explaining the remote control of the user information. The external control apparatus 124 has a PROXY 130 that translates a web service request (WS request) into XML and outputs the WS request expressed in XML. The remote interface 122 has an XML parser 131, a conversion library 132, and one or more WSFs 133a-133n.

The XML purser 131 determines whether the WS request follows the documents type definition (DTD), analyzes the syntax of the DTD, and converts the WS request into a tree-shaped parse that the conversion library 132 can use. The conversion library 132 converts the parse provided by XML parser 131 into WS requests. The WSF 133a-133n are functions provided by the method of the UCS 49 that realized the web service.

The PROXY 130 of the external control apparatus 124 converts the WS request into XML, and transmits the WS request expressed in XML to the NCS 48 of the multifunctional apparatus 1. The NCS 48 distributes the WS request expressed in the XML to XML parser 131 in compliance with the uniform resource locator (URL).

The XML parser 131 converts the WS request expressed in XML to a tree-shaped parse that the conversion library 132 can use, and then, provides the WS request to the conversion library 132. The conversion library 132 converts the parse provided by the XML parser 131 into the WS request and identifies the WSF 133a, for example, corresponding to the converted WS request. The UCS 49 provides the external control apparatus 124 with the web service such as the access to or the updating of the user information.

The PROXY 130, the conversion library 132, and the WSF 133a-133n are constructed based on the web service interface specification as showed in FIGS. 60A-60C described in the web service description language (WSDL). FIGS. 60A-60C show the interface specification written in the WSDL. FIGS. 60A-60C describes the web service to obtain a generation number.

A descriptive portion 3140 of the specification indicates that the input parameter used to obtain the generation number is "ticket" and the data type is binary. A descriptive portion 3141 of the specification indicates that the output parameter used to obtain the generation number is "returnValue" and "generation_out", the data type of "returnValue" is enumeration, and the data type of "generation_out" is non-negative integer.

A descriptive portion 3142 indicates which parameter the method corresponding to the obtaining of the generation number uses. In addition, <operation name="getGeneration"> of the descriptive portion 142 corresponds to WSF 133a, for example.

Figure 61:
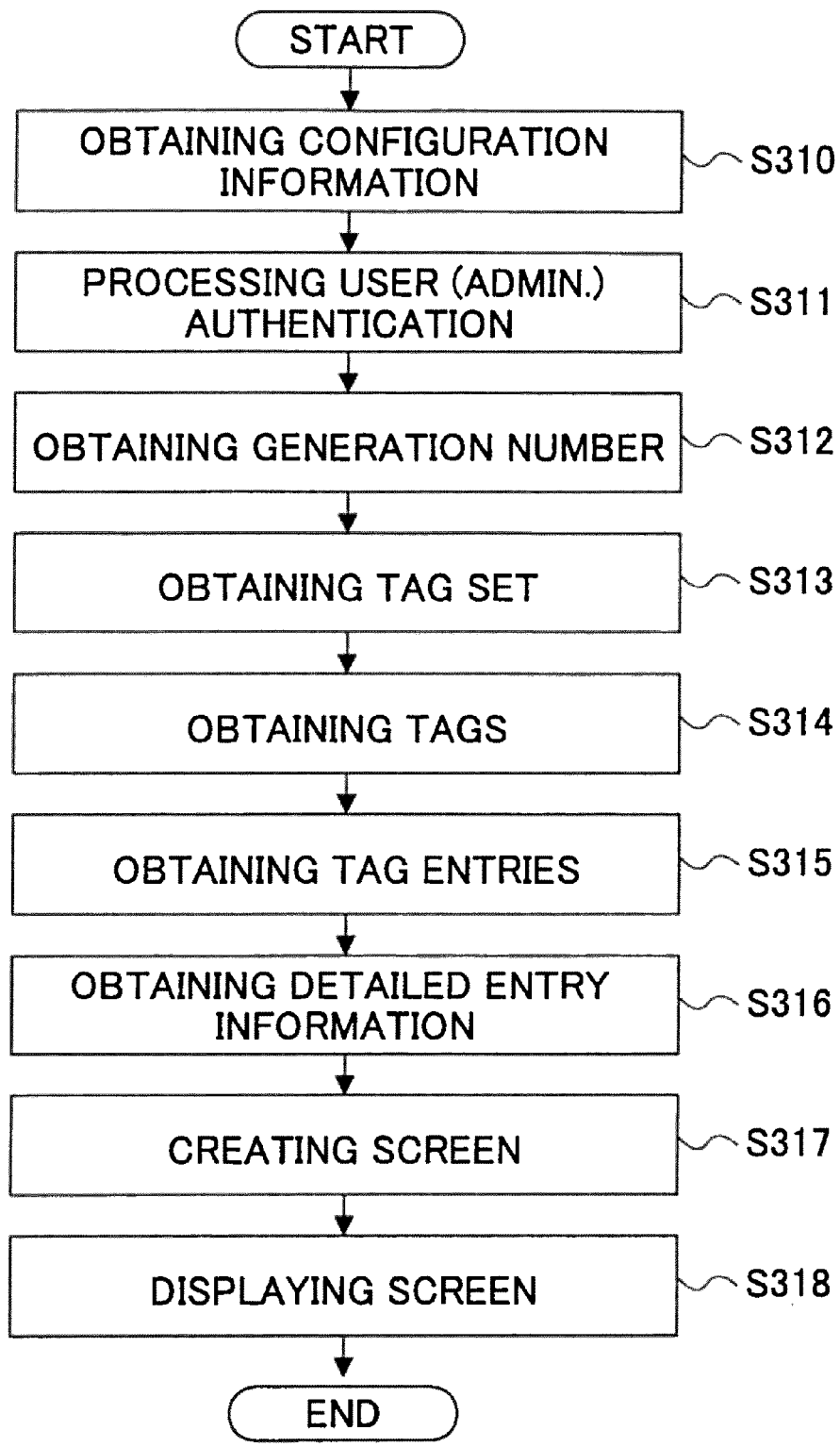
FIG. 61 is a flow chart showing an accessing operation of the user information using the remote control according to an embodiment.

Next, the access to the user information using the remote control will be described below by reference to the drawings. FIG. 61 is a flow chart showing the access to the user information using the remote control.

The external control apparatus 124 remote accesses the method provided by the remote interface 125 and uses the web service for obtaining the configuration information. Input/output parameters as showed in FIG. 62 are used for the web service for obtaining the configuration information. FIG. 62 illustrates the input/output parameters used for the web service for obtaining the configuration information. FIG. 63 illustrates the configuration information.

Subsequent to step S310, the external control apparatus 124 remotely accesses the method provided by the remote interface 122, and uses a web service for authenticating a user or an administrator (step S311). The web service for authenticating a user or an administrator uses input/output parameters as showed in FIG. 64. FIG. 64 illustrates the input/output parameters used for the web service for authenticating a user or an administrator.

The web service receives a password from the external control apparatus 124 as an input, and outputs authentication information to the external control apparatus 124. The authentication information indicates that the user or the administrator is authenticated. The web service for accessing and updating the user information requires the authentication information as an input parameter. This requirement prohibits unauthenticated person from accessing the user information.

After step S311, the external control apparatus 124 remotely accesses the method provided by the remote interface 125, and uses a web service for obtaining generation number (step S312). The web service for obtaining the generation number uses the input/output parameters as showed in FIG. 64.

FIG. 65 illustrates the input/output parameters used in the web service for obtaining the generation number. The web service for obtaining the generation number receives the authentication information from the external control apparatus 124 as an input parameter and output the generation number to the external control apparatus 124 as an output parameter. Because the generation number is updated whenever the user information is updated, the generation number can be used to determine whether the user information is updated or not in compliance with a request from another external control apparatus 124.

Subsequent to step S312, the external control apparatus 124 remote accesses the method provided by the remote interface 125, and uses a web service for obtaining the tag set (step S313). Input/output parameters as showed in FIG. 66 are used in the web service for obtaining the tag set. FIG. 66 illustrates the input/output parameters used in the web service for obtaining the tag set.

The web service for obtaining the tag set receives the authentication information and the generation number as input parameters and outputs the generation number and an array structured as the tag set information to the external control apparatus 124 as an output. FIG. 67 illustrates the data structure of a tag set.

After step S313, the external control apparatus 124 remotely accesses the method provided by the remote interface 125, and uses a web service for obtaining tags for each tag set obtained in step S313. The input/output parameters as showed in FIG. 68 are used in the web service for obtaining tags. FIG. 68 illustrates the configuration of the input/output parameters used in the web service for obtaining tags.

The web service for obtaining tags receives the authentication information, the generation number, and the tag set index number as input parameters, and outputs the generation number and the array structured as a tag to the external control apparatus 124 as output parameters. FIG. 69 illustrates the data structure of a tag.

Subsequent to step S314, the external control apparatus 124 remotely accesses the method provided by the remote interface 125, and uses a web service for obtaining tag entries for each tag obtained in step S314 (step S315). Input/output parameters as showed in FIG. 70 are used in the web service for obtaining tag entries. FIG. 70 illustrates the input/output parameters used in the web service for obtaining tag entries.

The web service for obtaining tag entries receives the authentication information, the generation number, the tag index number, filtering condition, entry offset, and the maximum number of tag entries to be obtained simultaneously as input parameters. On the other hand, the web service for obtaining tag entries outputs the generation number, the number of entries that satisfy the condition, whether all entries that satisfy the condition are obtained, and the array of entry information to the external control apparatus 124. FIG. 71 illustrates the filter conditions. FIG. 72 illustrates the data structure of entry.

In the case of filtering, members showed in FIG. 71 are usable. If a plurality of members are set "on", it means the logical sum of the "on" members. If "all" is "on", all entries are obtained whatever the other members are. If only "mail addressee" and "user code" are on, entries having mail addresses or usercodes are obtained, for example.

After step S315, the external control apparatus 124 remotely accesses the method provided by the remote interface 125, and uses a web service for obtaining detailed entry information (step S316).

In the case where account information is obtained as the detailed entry information, the web service for obtaining account information uses input/output parameters as showed in FIG. 73. FIG. 73 illustrates input/output parameters used for the web service for obtaining the account information. The web service for obtaining the account information receives the authentication information, the generation number, the array of entry ID numbers, and the designation of members to be obtained from the external control apparatus 124 as input parameters, and outputs the generation number and the array of account information to the external control apparatus 124 as output parameters. FIG. 74 illustrates the data structure of an account. FIG. 75 illustrates the data structure of a mail address. FIG. 76 illustrates the data structure of facsimile destination information. FIG. 77 illustrates the data structure of the usercode information.

In the case of obtaining group information as the detailed entry information, a web service for obtaining the group information uses input/output parameters as showed in FIG. 78. FIG. 78 shows the input/output parameters used in the web service for obtaining group information. The web service for obtaining the group information receives as input parameters the authentication information, the generation number, the array of entry index numbers, the designated member to be obtained from the external control apparatus 124, and outputs the generation number, the array of group information to the external control apparatus 124.

FIG. 79 shows the data structure of the group information, for example. FIG. 80 shows the data structure of the mail group information, for example. FIG. 81 shows the data structure of the facsimile group information, for example.

After step S316, the external control apparatus 124 creates a screen as showed in FIG. 92 based on the information obtained in steps S313-S316 (step S317). FIG. 92 illustrates the screen created in step S317.

The screen of FIG. 92 has four tabs with which the user can choose information about the number of printed pages by user (CHARGE INFO), the user restriction by the user (USER RESTRICTION), the e-mail addresses (E-MAIL INFO), and the facsimile addresses (FAX INFO). FIG. 92 illustrates the case where the e-mail addresses are displayed.

After step S317, the external control apparatus 124 displays the screen created in step S317. Since the user information is accessible using the external control apparatus 124 instead of the operation panel 70 of the multifunctional apparatus 1, more items of the user information can be displayed simultaneously.

The updating of the user information through the remote access will be described by reference to the drawings. After displaying the screen in compliance with the flow chart of FIG. 61, for example, the external control apparatus 124 remotely accesses the method provided by the remote interface 125 to realize the following: a web service for displacing tag information of a tag set, a web service for displacing entries of a tag, a web service for deleting an entry having a designated ID number, a web service for adding an account, a web service for updating account information, a web service for adding a group, a web service for updating the group information, and so forth.

FIG. 82 shows the input/output parameters used in the web service for displacing (replacing) tag information of a tag set for example. The web service for displacing tag information of a tag set receives as input parameters the authentication information, the generation number, the tag set control number, and the array of tags from the external control apparatus 124, and outputs as output parameters the generation number and the number of displaced tags to the external control apparatus 124.

FIG. 83 shows the input/output parameters used in the web service for displacing entries of a tag for example. The web service for displacing entries in a tag receives as input parameters the authentication information, the generation number, the tag index number, the offset, a flag indicating whether all displacements are completed, and the array of entry index numbers from the external control apparatus 124, and outputs as output parameters the generation number and the number of entries properly processed to the external control apparatus 124.

FIG. 84 shows the input/output parameters used in the web service for deleting entries having designated ID numbers. The web service for deleting entries having designated ID numbers receives as input parameters the authentication information, the generation number, the array of entry index numbers from the external control apparatus 124, and outputs the generation number and the number of deleted entries as output parameters to the external control apparatus 124.

FIG. 85 shows the input/output parameters used in the web service for adding new accounts. The web service for adding new accounts receives as input parameters the authentication information, the generation number, the array of account information from the external control apparatus 124, and outputs as output parameters the generation numbers and the array of index numbers of added new entries to the external control apparatus 124.

FIG. 86 shows the input/output parameters used in the web service for updating account information. The web service for updating the account information receives as input parameters the authentication information, the generation number, the designation of members to be updated, the array of account information from the external control apparatus 124, and output as output parameter the generation number and the number of updated entries to the external control apparatus 124.

FIG. 87 shows the input/output parameters used in the web service for adding new groups. The web service for adding new groups receives as input parameters the authentication information, the generation number, the array of group information from the external control apparatus 124, and outputs as output parameters the generation number and the array of index numbers of added new entries to the external control apparatus 124.

FIG. 88 shows the input/output parameters used in the web service for updating the group information. The web service for updating the group information receives as input parameters the authentication information, the generation number, the designation of members to be obtained, the array of group information from the external control apparatus 124, and outputs as output parameters the generation number and the number of updated entries to the external control apparatus 124.

Next, the backup and restoring of the user information using remote control will be described below by reference to the drawings. The backup of the user information can be performed by using the access operation to the user information described above. The external control apparatus 124 obtains the user information using the access operation of the user information, and then stores the obtained user information in a storage device so as to backup it.

On the other hand, the restoring of the user information is realized by following the steps described in the flow chart of FIG. 89, for example. FIG. 89 shows a flow chart of the restoring operation of the user information using remote control for example.

Since steps S320-S322 are the same as steps S310-S312 of FIG. 61, their description will be omitted.

The external control apparatus 124 remotely accesses the method provided by the remote interface 125 and uses the web service for processing before the restoring (step S323).

FIG. 90 shows the input/output parameters used in the web service for processing before restoring. The web service for processing before restoring receives as input parameters the authentication information and the generation number from the external control apparatus 124, and outputs as the output parameter the generation number to the external control apparatus 124.

After step S323, the external control apparatus 124 remotely accesses the method provided by the remote interface 125 and uses the web service for deleting all entries (step S324). The charge information stored in the flash memory 65, however, is not deleted.

After step S324, the external control apparatus 124 remotely accesses the method provided by the remote interface 125 and uses the web service for displacing tags in a tag set that is backed up already (step S325).

After step S325, the external control apparatus 124 remotely accesses the method provided by the remote interface 125 and uses the web service for adding all groups that are already backed up (step S326).

After step S326, the external control apparatus 124 remotely accesses the method provided by the remote interface 125 and uses the web service for adding all accounts that are already backed up (step S327).

Subsequent to step S327, the external control apparatus 124 remotely accesses the method provided by the remote interface 125 and uses the web service for displacing entries in a tag that is already backed up (step S328).

After step S328, the external control apparatus 124 remotely accesses the method provided by the remote interface 125 and uses the web service for processing after the restoring (step S329).

FIG. 91 shows the input/output parameters used in the web service for processing after the restoring. The web service for processing after the restoring receives as input parameters the authentication information and the generation number from the external control apparatus 124, and outputs the generation number to the external control apparatus 124.

Following the steps of FIG. 89, the external control apparatus 124 can restore the user information stored in the flash memory 65 or the HDD 66 using the backup user information. As described above, thanks to the remote interface 125, the user can remotely control the user information stored in the multifunctional apparatus 1 according to this embodiment of the present invention.

In the case of the configuration showed in FIG. 3, the UCS 49 is included in the control service, but the present invention is not limited to this configuration. The UCS 49 may be provided in the application programs 30.

Though the multifunctional apparatus 1 is described in this embodiment, those skilled in the art may recognize that the present invention is easily applicable to the information processing apparatus 1000. In the case of the information processing apparatus 1000, the user information control unit 1260 instead of the UCS 49 controls the user information. In this case, no component corresponding to the SCS 42 is required.

This patent application is based on Japanese priority patent applications No. 2002-050539 filed on Feb. 26, 2002, No. 2002-050540 filed on Feb. 26, 2002, No. 2002-050547 filed on Feb. 26, 2002, No. 2003-39974 filed on Feb. 18, 2003, No. 2003-39975 filed on Feb. 18, 2003, No. 2003-39976 filed on Feb. 18, 2003, No. 2003-39977 filed on Feb. 18, 2003, No. 2003-39978 filed on Feb. 18, 2003, and No. 2003-39979 filed on Feb. 18, 2003, the entire contents of which are hereby incorporated by reference.

What is claimed is:

1. An image processing apparatus, comprising:
   image processing hardware including at least one of a printer unit and a scanner unit;
   an operating system;
   a plurality of application programs, operable on the operating system, and configured to process images using the image processing hardware; and
   a user information control program operable on the operating system and configured to receive a request for user information including distribution address information from any one of the plurality of application programs, obtain the user information including the distribution address information from one of a first memory and a second memory based on the request, and provide the obtained user information to the application program from which the request for user information including the distribution address information was received, wherein
   the user information control program comprises an application program interface that allows for reception of the request from any one of the plurality of application programs using a predefined function.

2. The image processing apparatus as claimed in claim 1, wherein the user information control program, in response to the reception of the request from any one of the plurality of application programs, identifies the first memory or the second memory as storing the user information corresponding to the request, and obtains the user information from the identified memory.

3. The image processing apparatus as claimed in claim 1, wherein the user information includes at least one of user restriction and charge information; and
   the user information control program identifies the first memory or the second memory as storing the distribution address information and the at least one of user restriction and charge information and obtains the distribution address information and the at least one of user restriction and charge information from the identified memory.

4. The image processing apparatus as claimed in claim 1, wherein the user information control program comprises an application program interface that allows for reception from any one of the plurality of application programs of at least one of:
   a request for the user information;
   a request for functional information;
   a request for notice of update of the user information;
   a request for obtaining index for classifying the distribution address information;
   a request for obtaining distribution address information classified in an index;
   a request for obtaining the order of an item of distribution address information;
   a request for obtaining a control number of distribution address information corresponding to a registration number input by a user;
   a request for obtaining an index in which distribution address information corresponding to the control number is classified;

a request for e-mail address information corresponding to the control number;

a request for obtaining sender authentication information corresponding to the control number;

a request for obtaining user restriction information corresponding to the control number;

a request for obtaining e-mail group information corresponding to the control number; and a request for distribution address information corresponding to a search condition.

5. The image processing apparatus as claimed in claim 1, wherein the user information control program is a process.

6. A method of controlling user information for an image processing apparatus comprising image processing hardware including at least one of a printer unit and a scanner unit, an operating system, a plurality of application programs, operable on the operating system, and configured to process images using the image processing hardware, and a user information control program commonly accessed and used by any one of the plurality of application programs, the user information control program running on the operating system, the method comprising:

requesting, by any one of the plurality of application programs, the user information control program for user information including distribution address information;

obtaining, by the user information control program, the user information including the distribution address information from one of a first memory and a second memory based on the request; and providing, by the user information control program, the obtained user information to the application program from which the request for user information including the distribution address information was received, wherein the user information control program comprises an application program interface that allows for reception of the request from any one of the plurality of application programs using a predefined function.

7. The method as claimed in claim 6, further comprising:

identifying, by the user information control program, in response to the reception of the request from any one of the plurality of application programs, the first memory or the second memory as storing the user information corresponding to the request; and obtaining the user information from the identified memory.

8. The method as claimed in claim 6, wherein the user information includes at least one of user restriction and charge information, and the method further comprises:

identifying, by the user information control program, the first memory or the second memory as storing the distribution address information and the at least one of user restriction and charge information; and obtaining the distribution address information and the at least one of user restriction and charge information from the identified memory.

9. The method as claimed in claim 6, wherein the user information control program comprises an application program interface that allows for reception from any one of the plurality of application programs of at least one of:

a request for the user information;

a request for functional information;

a request for notice of update of the user information;

a request for obtaining index for classifying the distribution address information;

a request for obtaining distribution address information classified in an index;

a request for obtaining the order of an item of distribution address information;

a request for obtaining a control number of distribution address information corresponding to a registration number input by a user;

a request for obtaining an index in which distribution address information corresponding to the control number is classified;

a request for e-mail address information corresponding to the control number;

a request for obtaining sender authentication information corresponding to the control number;

a request for obtaining user restriction information corresponding to the control number;

a request for obtaining e-mail group information corresponding to the control number; and a request for distribution address information corresponding to a search condition.

10. The method as claimed in claim 6, wherein the user information control program is a process.

* * * * *